United States Patent
Liu et al.

(10) Patent No.: US 6,609,988 B1
(45) Date of Patent: Aug. 26, 2003

(54) ASYMMETRIC DAMPING TENSIONER BELT DRIVE SYSTEM

(75) Inventors: Keming Liu, Sterling Height, MI (US); Alexander Serkh, Troy, MI (US)

(73) Assignee: The Gates Corporation, Denver, CO (US)

(*) Notice: Subject to any disclaimer, the term of this patent is extended or adjusted under 35 U.S.C. 154(b) by 0 days.

(21) Appl. No.: 09/864,536

(22) Filed: May 24, 2001

(51) Int. Cl.[7] .................................................. F16H 7/12
(52) U.S. Cl. ....................................... 474/133; 474/135
(58) Field of Search .............................. 474/135, 101, 474/109, 133–138

(56) References Cited

U.S. PATENT DOCUMENTS

| | | | | |
|---|---|---|---|---|
| 4,473,362 A | * | 9/1984 | Thomey et al. | 474/135 |
| 4,696,663 A | | 9/1987 | Thomey et al. | 474/133 |
| 4,808,148 A | | 2/1989 | Holtz | 474/112 |
| 4,906,222 A | * | 3/1990 | Henderson | 474/135 |
| 4,959,042 A | | 9/1990 | Tanaka et al. | 474/134 |
| 5,362,280 A | * | 11/1994 | Hirai et al. | 474/135 |
| 5,439,420 A | | 8/1995 | Meckstroth et al. | 474/133 |
| 5,531,648 A | | 7/1996 | Meckstroth et al. | 474/110 |
| 5,632,697 A | * | 5/1997 | Serkh | 474/109 |
| 5,647,813 A | * | 7/1997 | Serkh | 474/135 |
| 5,733,214 A | | 3/1998 | Shiki et al. | 474/69 |
| 6,102,820 A | * | 8/2000 | Imaharu et al. | 474/135 |

FOREIGN PATENT DOCUMENTS

| | | | | |
|---|---|---|---|---|
| EP | | 524431 A1 | * 1/1993 | 474/135 |
| JP | | 06264981 A | * 9/1994 | |

* cited by examiner

Primary Examiner—Marcus Charles
(74) Attorney, Agent, or Firm—J. A. Thurnau, Esq.; C. H. Castleman, Esq.; S. G. Austin, Esq.

(57) ABSTRACT

The invention comprises an asymmetric damping tensioner system for belt drives on an engine. A belt is connected between a driver pulley on a crankshaft and any number of driven pulleys. Each driven pulley is connected to an accessory such as an alternator, power steering pump, compressor or the like. The tensioner is placed anywhere before the first component of significant effective inertia, in the belt movement direction. A biasing member in the tensioner is used to maintain a tension in the belt. The tensioner further comprises a damping mechanism to damp belt vibrations caused by the operation of the engine. Tensioner damping friction is unequal or asymmetric, depending upon the direction of movement of the tensioner arm. During acceleration the damping friction of the tensioner in the unloading direction is significantly lower than the damping friction in the opposite, or loading direction, as is the case during deceleration. Lower damping friction during acceleration allows the tensioner arm to quickly adjust to the increase in belt length caused by acceleration. Higher damping friction during deceleration prevents the tensioner arm from being moved too far in the loading direction thereby causing slipping and noise. Asymmetric damping also significantly diminishes overall vibration in the belt during all phases of operation.

20 Claims, 17 Drawing Sheets

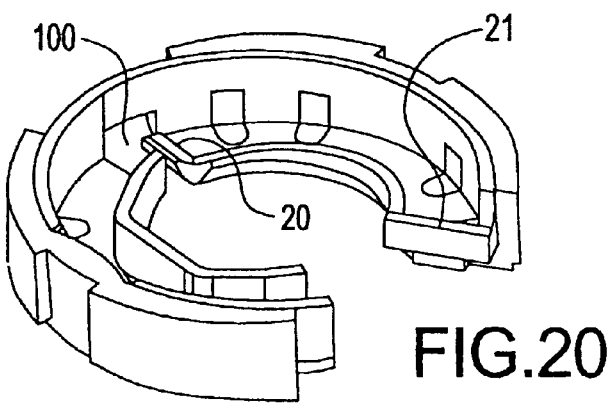
FIG.20
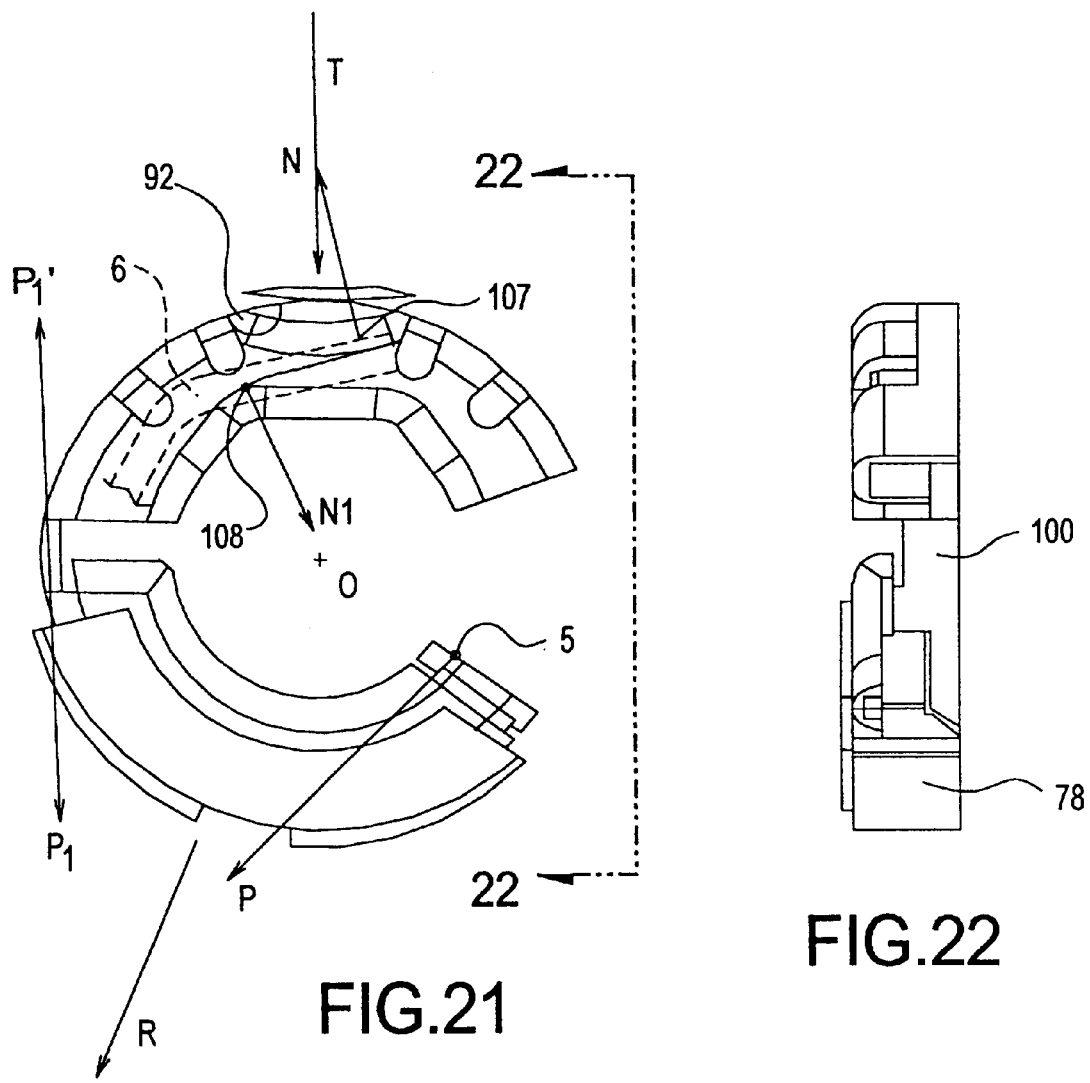
FIG.21
FIG.22

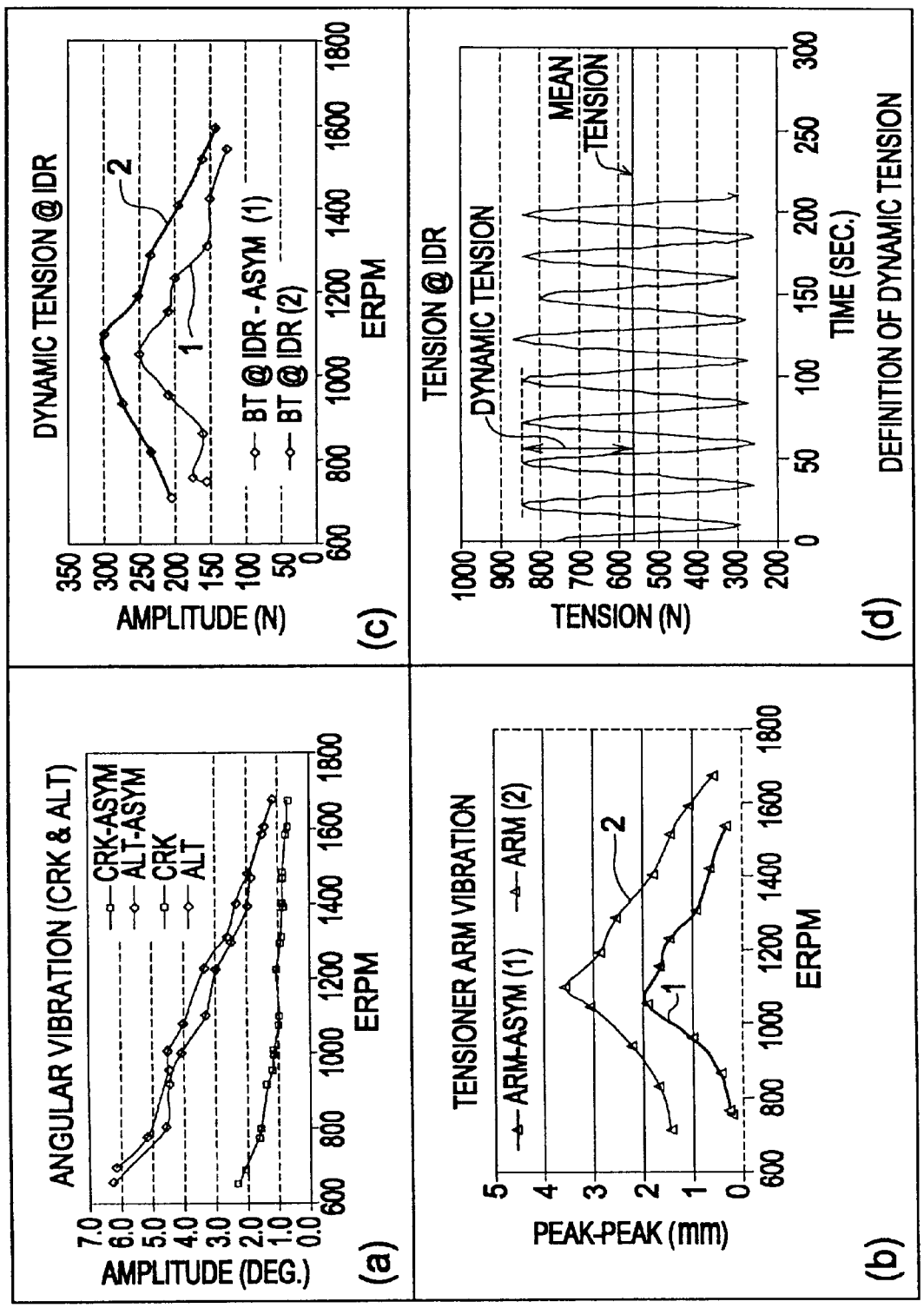
FIG. 29 SYSTEM DYNAMICS: CONVENTIONAL VS. ASYMMETRIC

ASYMMETRIC DAMPING TENSIONER BELT DRIVE SYSTEM

FIELD OF THE INVENTION

The invention relates to front end accessory drives, and more particularly to belt drive systems having an asymmetric damping tensioner.

BACKGROUND OF THE INVENTION

Most engines used for automobiles and the like include a number of belt driven accessory systems which are necessary for the proper operation of the vehicle. The accessory systems may include an alternator, air conditioner compressor and a power steering pump.

The accessory systems are generally mounted on a front surface of the engine. Each accessory has a pulley mounted on a shaft for receiving power from some form of belt drive. In early systems, each accessory was driven by a separate belt that ran between the accessory and the crankshaft. Due to improvements in belt technology, single serpentine belts are now generally used in most applications. A single serpentine belt routed among the various accessory components drives the accessories. The engine crankshaft drives the serpentine belt.

Since the serpentine belt must be routed to all accessories, it has generally become longer than its predecessors. To operate properly, the belt is installed with a pre-determined tension. As it operates, it stretches slightly over its length. This results in a decrease in belt tension, which may cause the belt to slip. Consequently, a belt tensioner is used to maintain the proper belt tension as the belt stretches during use.

As a belt tensioner operates, the running belt may excite oscillations in the tensioner spring. These oscillations are undesirable, as they cause premature wear of the belt and tensioner. Therefore, a damping mechanism is added to the tensioner to damp operational oscillations.

Various damping mechanisms have been developed. They include viscous fluid dampers, mechanisms based on frictional surfaces sliding or interaction with each other, and dampers using a series of interacting springs. For the most part these damping mechanisms operate in a single direction by resisting a movement of a belt in one direction. This generally resulted in undamped vibrations existing in a belt during operation as the tensioner arm oscillated between loaded and unloaded positions.

The prior art systems rely on a tensioner set up to be compliant in order to follow the motion of the belt. Usually the tensioner is set up with a low damping rate to facilitate this compliance. As a result the prior art systems operated in an unsatisfactory manner during load changes. The accessory drive operated normally when the engine was running at a steady RPM. The tensioner bearing against the belt would maintain a tension in the span. Generally, the tensioner is 'downstream' of the crankshaft in a belt movement direction. Damping was set so that the tensioner would damp most of the vibrations in the running belt.

The problems arise when the engine speed is rapidly changed, in the range of 5000 to 10000 RPM/sec. In this case, the accessories such as the alternator continue to drive the belt after a speed reduction due to rotational inertia. This causes the belt on the 'downstream' side of the crankshaft to tighten, loading the tensioner. If the damping rate in the tensioner is too low the tensioner will be unable to resist the increase in belt tension and the arm will move in a direction away from the belt. As a result, the tensioner is not maintaining sufficient tension in the belt. This will allow the belt to slip on the crankshaft pulley, since the belt is now being driven toward the crankshaft, causing squeeking noises. Prior art systems rely on a means of locking the tensioner arm in the loading direction to prevent the decrease in belt tension. However, locking the tensioner prevents the tensioner from performing its corollary function of damping vibrations in the belt.

Representative of the prior art is U.S. Pat. No. 5,439,420 to Meckstroth et al. which discloses an accessory drive system including a tensioner having a governor for controlling rotational motion of the arm with the arm being able to rotate freely in the direction in which tension of the belt is increased and with the governor resisting motion of the arm in the direction in which tension in the belt is decreased.

The prior art also teaches a method of arranging engine accessories so that the order of rotational interial force is greatest for the accessory nearest the crankshaft pulley as seen from the tight side of the belt. This is taught in U.S. Pat. No. 4,959,042 to Tanaka. This method does not rely on the operational characteristics of the tensioner, instead relying on the dynamics of the staggered order of the accessories based upon rotational interia.

The prior art systems depend upon a locking tensioner or upon a particular mechanical arrangement to address the problem of high rate of change of engine speed. Neither system solves the dual problems of preventing squeal during speed changes while continuing to damp belt vibrations. Further, the prior art systems, in the case of Mechstroth are complex and expensive, requiring complex mechanical devices to control the movement of a tensioner arm. The prior art systems are relatively large requiring room on the engine surface. The Tanaka method does not fully address the issue of high deceleration rates, relying instead on the arrangement of the components which does not fully defeat the tightening of the belt during deceleration.

Reference is also made to co-pending U.S. patent application Ser. No. 09/861,338 filed May 18, 2001 which discloses a tensioner having a damping mechanism.

What is needed is an asymmetric damping tensioner belt drive system having an asymmetric damping tensioner. What is needed is an asymmetric damping tensioner belt drive system capable of providing a higher belt tension during rapid changes in engine speed. What is needed is an asymmetric damping tensioner belt drive system having a greater damping friction in a loading direction than an unloading direction. What is needed is an asymmetric damping tensioner belt drive system having a coefficient of asymmetry in excess of 1.5. The present invention meets these needs.

SUMMARY OF THE INVENTION

The primary aspect of the invention is an asymmetric damping tensioner belt drive system having an asymmetric damping tensioner.

Another aspect of the invention is to provide an asymmetric damping tensioner belt drive system capable of providing a higher belt tension during rapid changes in engine speed.

Another aspect of the invention is to provide an asymmetric damping tensioner belt drive system having a greater damping friction in a loading direction than an unloading direction.

Another aspect of the invention is to provide an asymmetric damping tensioner belt drive system having a coefficient of asymmetry in excess of 1.5.

Other aspects of the invention will be pointed out or made obvious by the following description of the invention and the accompanying drawings.

The invention comprises an asymmetric damping tensioner system for belt drives on an engine. A belt is connected between a driver pulley on a crankshaft and any number of driven pulleys. Each driven pulley is connected to an accessory such as an alternator, power steering pump, compressor or the like. The tensioner is placed anywhere before the first component of significant effective inertia, in the belt movement direction. A biasing member in the tensioner is used to maintain a tension in the belt. The tensioner further comprises a damping mechanism to damp belt vibrations caused by the operation of the engine. Tensioner damping friction is unequal or asymmetric, depending upon the direction of movement of the tensioner arm. During acceleration the damping friction of the tensioner in the unloading direction is significantly lower than the damping friction in the opposite, or loading direction, as is the case during deceleration. Lower damping friction during acceleration allows the tensioner arm to quickly adjust to the increase in belt length caused by acceleration. Higher damping friction during deceleration prevents the tensioner arm from being moved too far in the loading direction thereby causing slipping and noise. Asymmetric damping also significantly diminishes overall vibration in the belt during all phases of operation.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 20 is a top perspective view of an alternate damping mechanism.

FIG. 21 is a bottom plan view of a second alternate embodiment.

FIG. 22 is a side elevation view of the damping mechanism along line 22—22 in FIG. 21.

FIG. 29A is a comparison of tensioner parameters showing angular vibration.

FIG. 29B is a comparison of tensioner parameters showing tensioner arm vibration.

FIG. 29C is a comparison of tensioner parameters showing dynamic tension.

FIG. 29D is a comparison of tensioner parameters showing tension at an idler pulley.

DETAILED DESCRIPTION OF THE PREFERRED EMBODIMENT

Described herein is a tensioner having an asymmetric damping characteristic. An asymmetric tensioner dissipates more energy than a conventional tensioner assuming that both tensioners have the same tensioner force. Another major benefit of the asymmetric tensioner is that it can provide much higher damping rate for a given belt drive system as compared to a conventional tensioner.

There are two major differences between the operation of an asymmetric tensioner compared to a conventional tensioner. First, the friction force and hence the dissipated vibration energy is significantly higher during a tensioner loading half-cycle than those during a tensioner unloading half-cycle for an asymmetric tensioner. These forces are approximately equal for a conventional tensioner. Second, the belt drive energy is dissipated through tensioner damping only in the loading half-cycle because of the biased damping function of the tensioner. Tensioner damping in the unloading half-cycle dissipates the mechanical energy of the tensioner only, not of the belt or other components.

Figure 1:
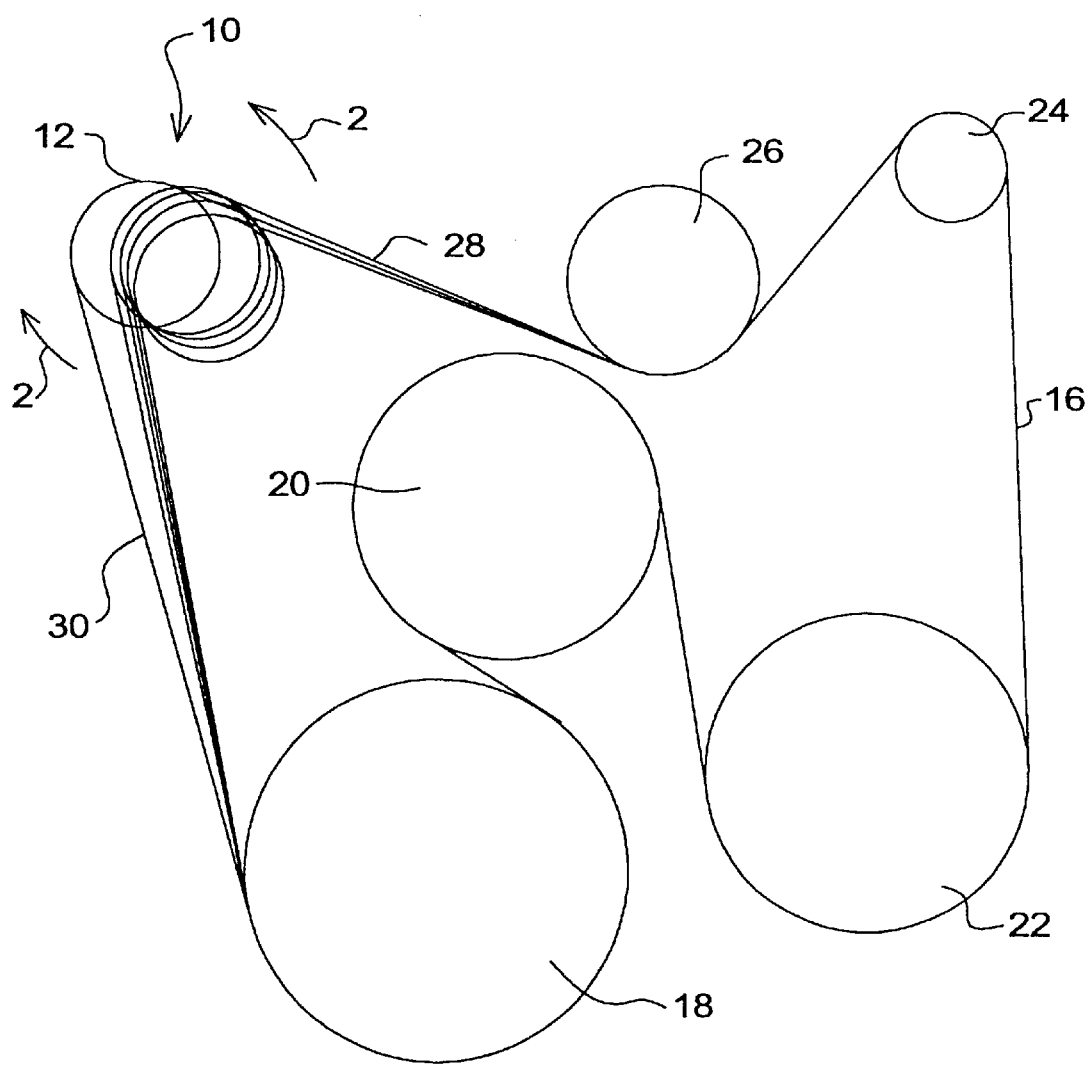
FIG. 1 is a front view schematic of a front end accessory drive system that includes a belt tensioner having a damping mechanism of the invention.

In particular, at any time, the force applied on the belt cannot be too low otherwise belt slip will occur on the component pulleys, such as the alternator or crankshaft, see FIG. 1. Generally, the damping friction during in the unloading direction should not be higher than 70% of the tensioner spring force. In the case of a conventional tensioner, since the loading and unloading damping is substantially equal the friction in the loading direction will also be 70% of the spring force. For example, if the spring torque of a conventional tensioner is 15 N-m and the damping factor is 70%, the damping torque will be 10.5 N-m in both directions. If more damping is needed, the spring force has to be increased to maintain the proper low end tension. Increasing the spring rate will reduce belt life as well as increase the bearing load of some components.

On the other hand, with an asymmetric tensioner having the same belt tension, if the asymmetric factor, $K_{AS}$, is for example, three, the friction damping in the loading direction will be three times of that of the unloading direction. As a result it is also three times that of the conventional tensioner, providing significantly higher damping to the system without increasing the belt tension.

Therefore, compared with the conventional tensioner, the asymmetric tensioner has two further advantages. First, using equivalent springs, much higher damping can be provided. Or, for the same damping effect in the loading direction, the belt drive will be subjected to lower tension with the asymmetric tensioner. As a result, asymmetric damping is more effective in controlling system vibration as well as significantly increasing belt life.

The damping mechanism and tensioner described herein is substantially the same as that described in U.S. non-provisional patent application Ser. No. 09/482,128 filed Jan. 12, 2000, which is incorporated herein by reference.

Figure 2:
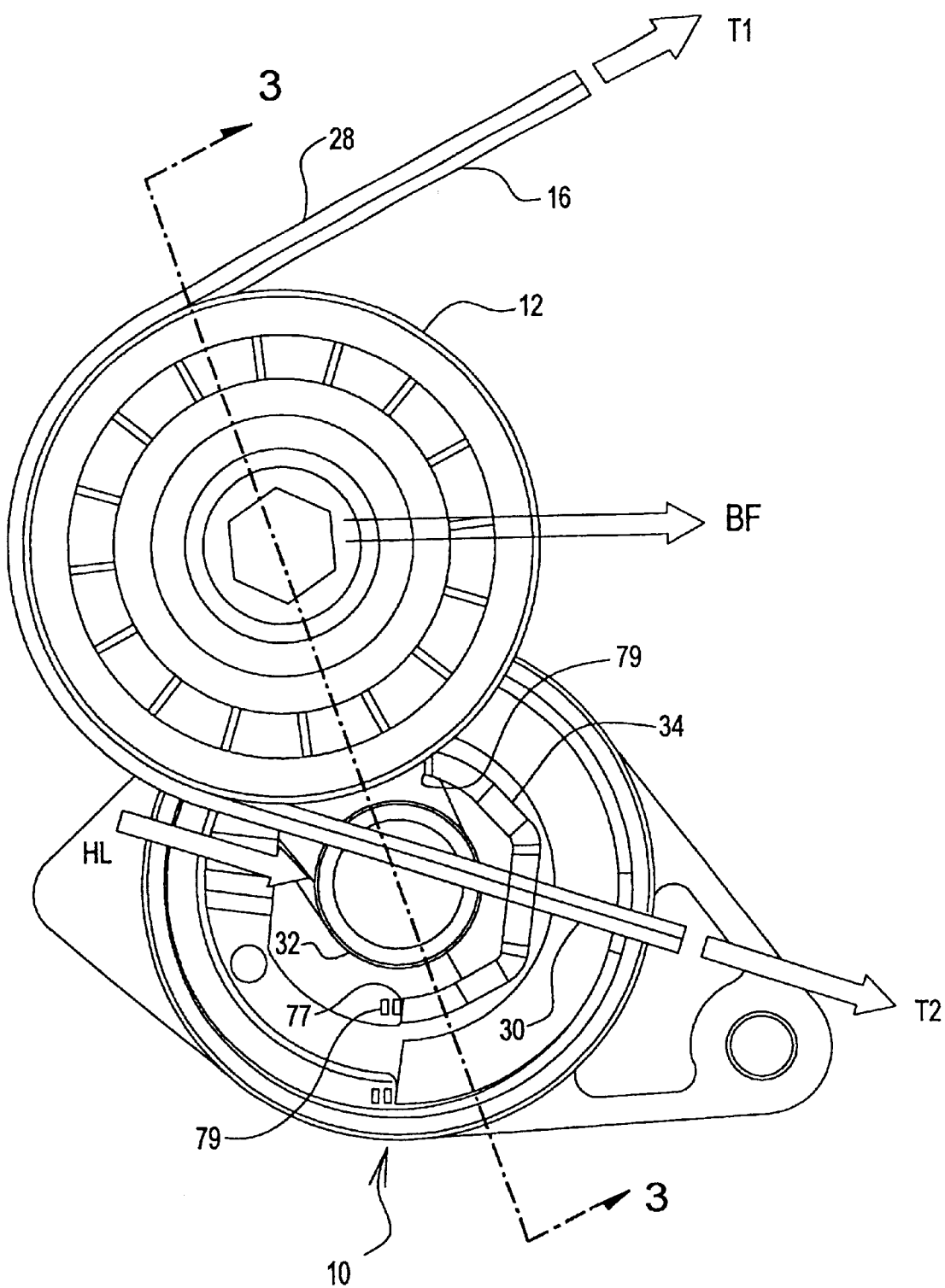
FIG. 2 is an enlarged partial schematic view taken generally at line 2—2 of FIG. 1 illustrating various component forces associated with the tensioner.

Referring to FIGS. 1 and 2, a tensioner 10 with a pulley 12 is illustrated as a component part of a belt drive system that includes a belt 16 and several pulleys. By way of example, the belt 16 is entrained around a crank pulley 18, a fan/water pump pulley 20, a power steering pulley 22, an alternator pulley 24, an idler pulley 26, and the tensioner pulley 12. The tensioner pulley 12 engages the belt 16 and is shown in several positions to schematically show how the pulley moves to adjust belt tension. The tensioner pulley 12 engages the belt 16 and receives a belt load in the form of belt tension T1, T2, of adjacent belt spans 28, 30. The belt tension T1, T2 (or load) combine to generate a belt force component BF along a bisector or an angle formed between the belt spans 28, 30. The belt force component being axially off-set from a pivot 32 of the tensioner, generates a complicated hub load including forces and moments that are symbolically (i.e. not specifically) represented by the arrow HL. The damping mechanism of the invention is shown at 34 in the tensioner 10.

Figure 3:
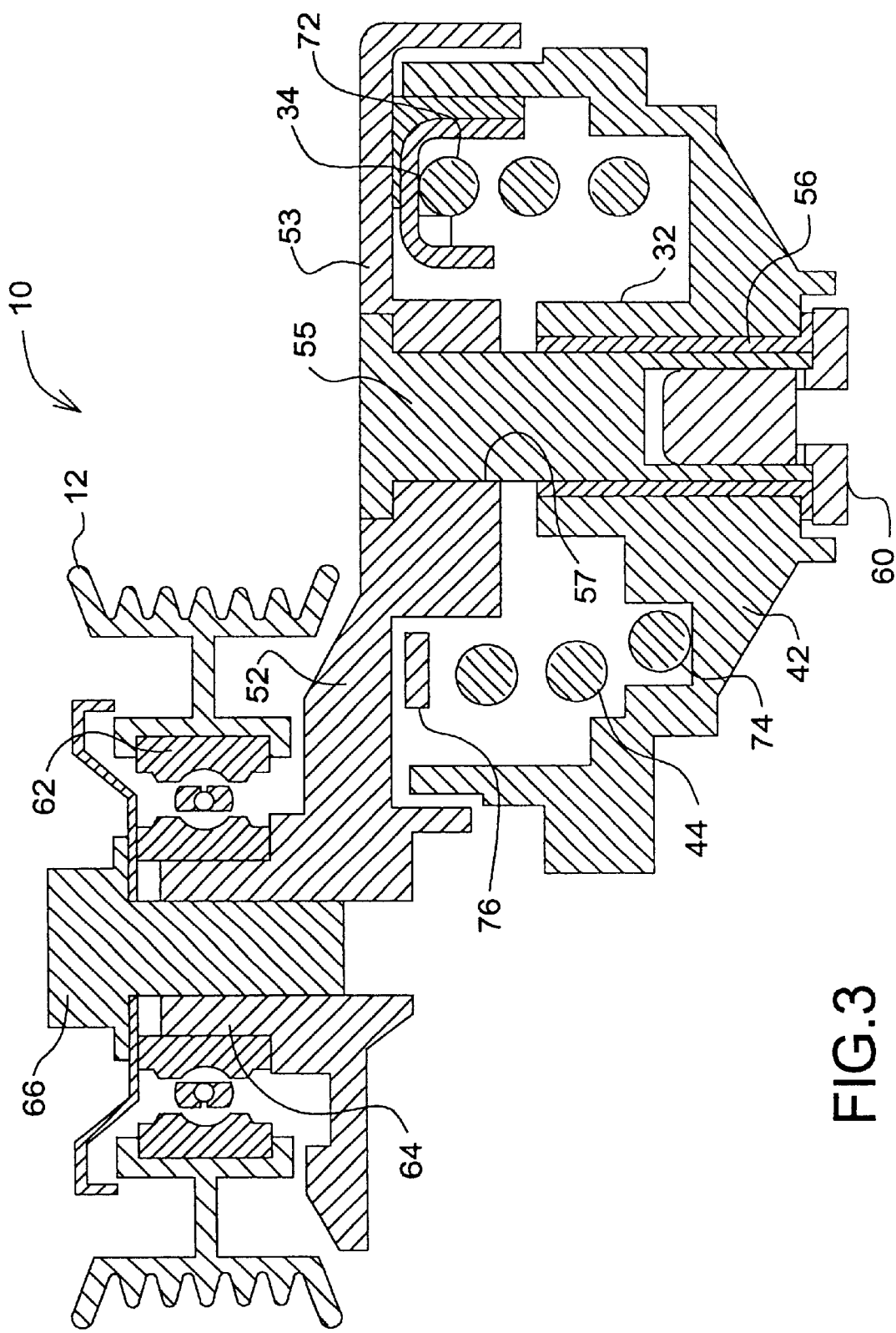
FIG. 3 is a cross-sectional view taken along the line 3—3 of FIG. 2.

Referring the FIG. 3, the tensioner 10 is of the mechanical type including the damping mechanism 34 of the invention includes a base 42, a torsion spring 44 and a pulley 12 rotatably mounted to a pivot-arm 52 such as by means of a ball bearing 62 on a shaft 64. The ball bearing 62 is retained on the shaft 64 by a flanged fastener 66. The pivot-arm 52 is attached to a cylindrical member 53 that supports the pivot-arm 52 and rotates with a pivot shaft 55. At least one sleeve type bushing 56 is positioned in the pivot 32. The pivot bushing 56 is preferably of the polymeric type and positioned in the pivot for rotating against the pivot shaft 55 to thereby support the pivot-arm 52. While one pivot bushing 56 is represented, it is possible to have more than one pivot bushing. The pivot shaft 55 including a fastener 60, extends through a flanged bore 57 in the cylindrical member 53 and the pivot bushing 56 to thereby attach the pivot-arm 52 to the base 42.

Figure 4:
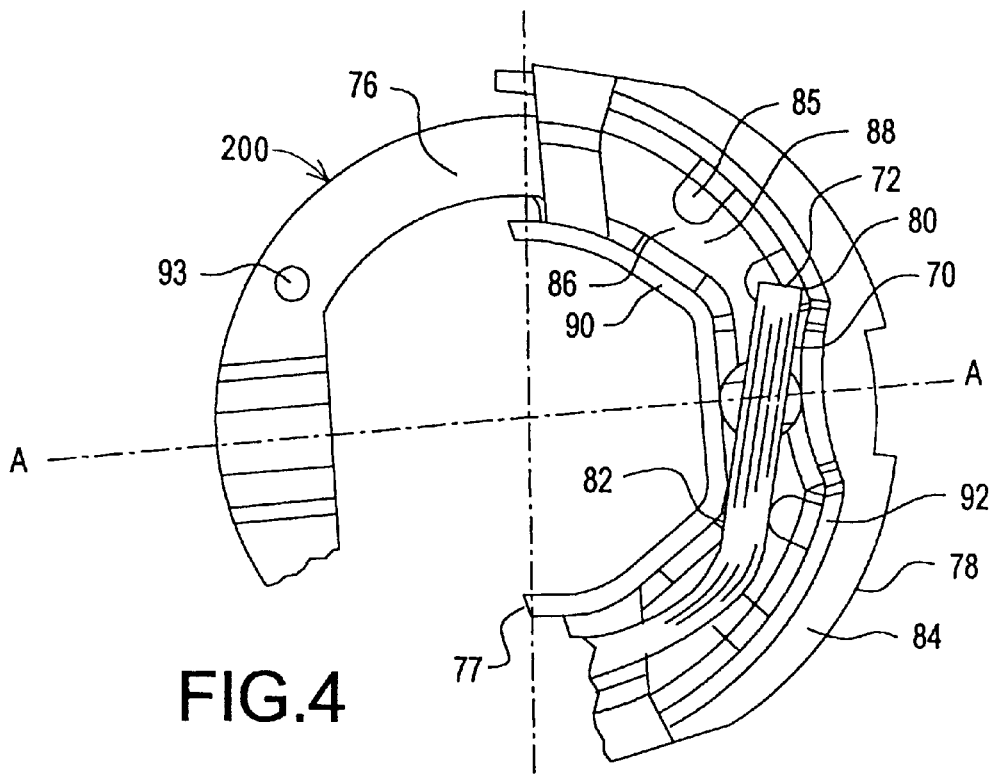
FIG. 4 is an enlarged view showing the damping mechanism of the invention.

Referring to FIGS. 2–4 the damping mechanism 34 includes a torsion spring 70 having first 72 and second 74 ends. The damping mechanism 34 further includes a damping plate 76 having an outer friction surface 78 for engagement in this embodiment with the base 42 of the tensioner 10. A ramp surface 77 is provided for mating engagement with a proturbance 79 of the pivot-arm 52. The damping plate 76 includes first 80 and second 82 spring contact points for operatively connecting the spring 70 to the damping plate 76. In the embodiment shown in FIG. 4, the damping plate 76 is symmetrical about the A—A axis thereby allowing installation of the spring 70 having a different spring coil wind direction.

The damping plate includes a channel 86 for receiving the spring 70 having a plate base 88, an inner wall 90 and an outer wall 92. The plate base includes friction pads 93 periodically spaced on a bottom surface 200 for sliding engagement with the tensioner cylindrical member 53.

The damping plate 76 includes an attached lining 84 that defines the friction surface 78 and is attached to the damping plate 76 by the use of mechanical tabs 85 for fixedly adhering the lining 84 thereto.

Figure 5:
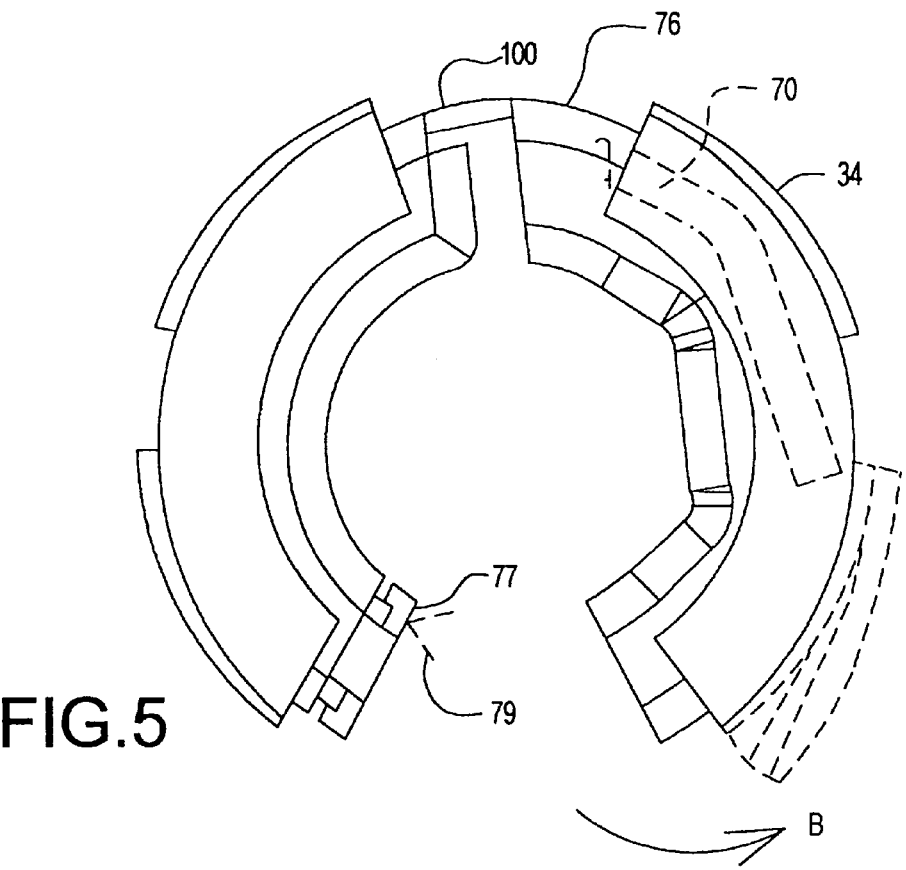
FIG. 5 is an alternative embodiment of the damping mechanism having a semi-circular shape.

The damping mechanism 34 as shown in FIGS. 2–4 is shaped circular. Another embodiment of the damping mechanism 34 is shown in FIG. 5 where the damping plate is semi-circular. The damping plate 76 includes a pivot joint 100 allowing the damping plate 76 under torque from the spring 70 to have relative motion indicated by B. The additional movement of the damping plate 76 provides increased friction force for damping.

Figure 6:
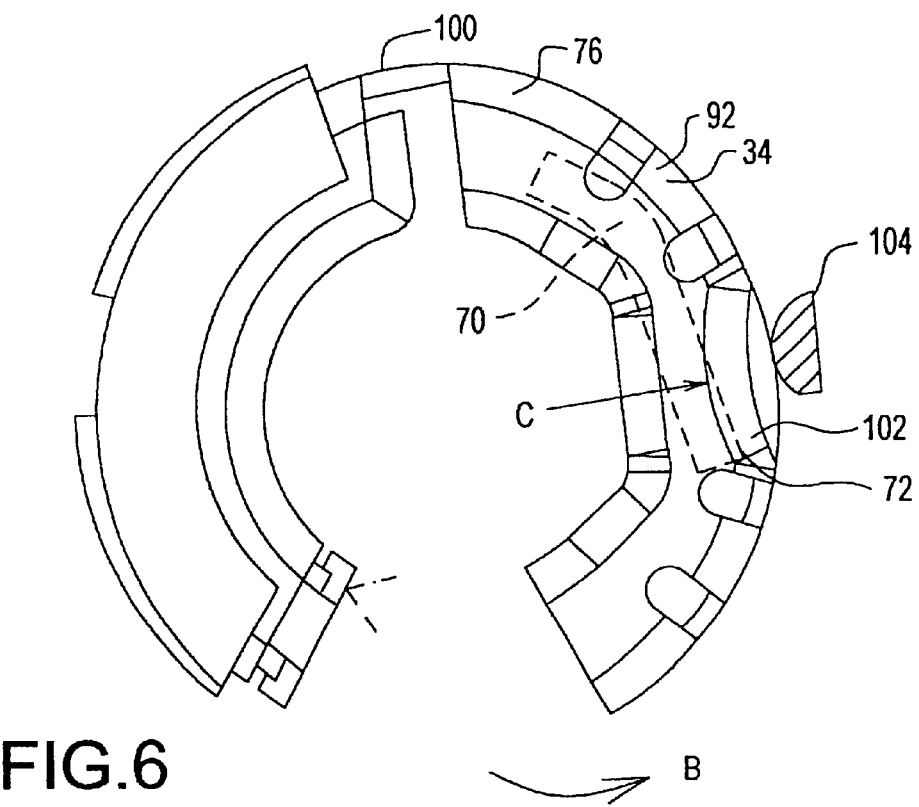
FIG. 6 is an alternative embodiment of the damping mechanism having a semi-circular shape and an outer wall having a deflecting band.

In another embodiment shown in FIG. 6, a semi-circular damping plate 76 is provided including a deflecting band 102 on the outer wall 92. In this embodiment, the force applied by spring end 72 acts upon the deflecting band 102 as shown in C, for allowing radial engagement with the tensioner in order to assist in loading the pivot-arm 52. In this embodiment, the deflecting band 102 has contact with additional support 104 attached to the tensioner arm 52.

Figure 7:
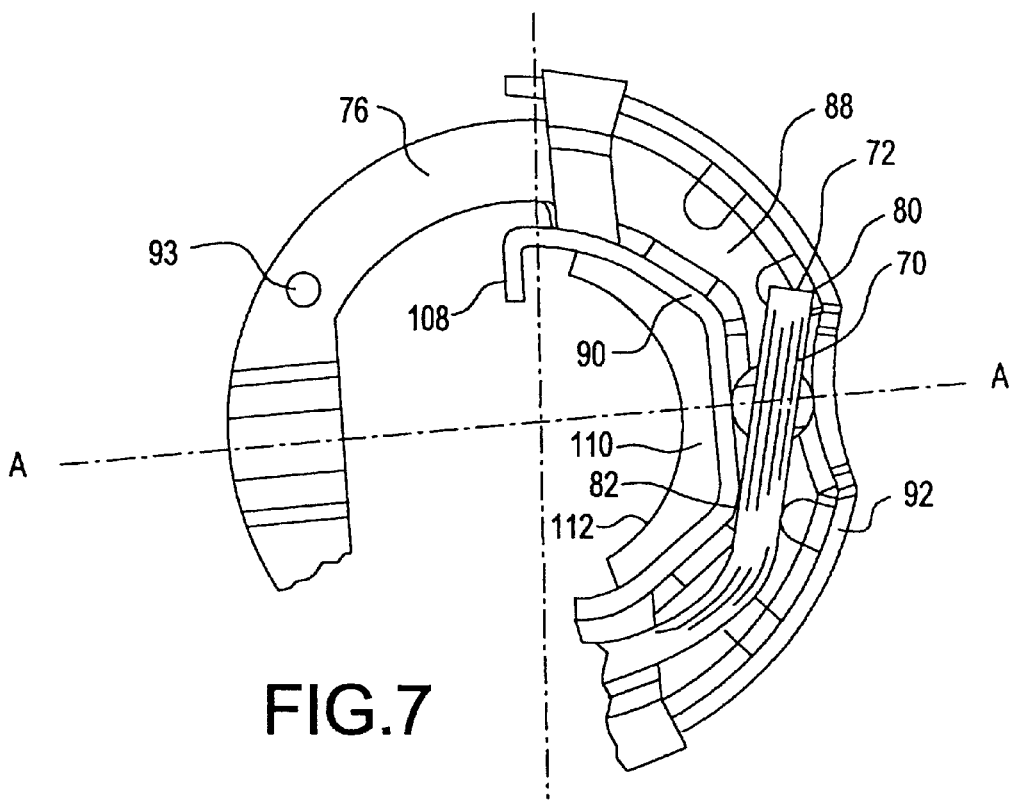
FIG. 7 is an alternative embodiment of the damping mechanism having an inner friction surface.

FIG. 7 shows another embodiment of the damping mechanism including the inner wall 90 having a lining 110 including an inner friction surface 112.

Figure 8:
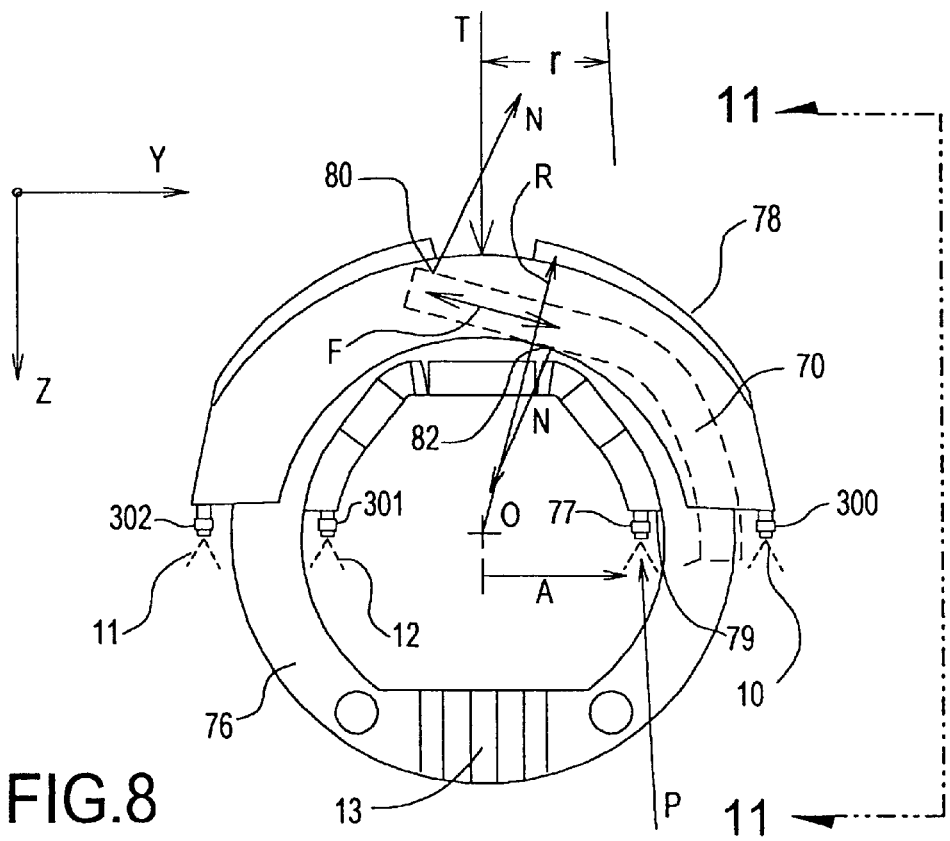
FIG. 8. depicts a bottom view of the forces acting on the damping plate.

Reference is made to FIG. 8, which depicts a bottom view of the forces acting on the damping plate. The damping characteristic of the tensioner using the inventive damping plate, also referred to as damping mechanism, is asymmetric. This is best described in terms of the forces operating on the damping mechanism or plate, that is, a first damping force $T_L$ acts on a movement of the pivot arm in a first direction away from an endless member and a second damping force $T_{un}$ acts on a movement of the pivot arm in a second direction toward an endless member, the first damping force being greater than the second damping force.

In the stationary position a biasing member or torsion spring with spring torque, $T_{spr}$, creates reactions N and N on first and second contact points 80, 82. The other end of the spring engages the base 42 which is constrained from rotation, resulting in a torque. The damping mechanism is substantially maintained in a predetermined position relative to the pivot arm between ramp surface 77 and contact point 79 and friction surface 78. Further, ramp surface 300 engages contact point 10 for lower damping force. In the case of opposite movement, ramp surface 302 engages contact point 11 for lower damping force and ramp surface 310 engages contact point 12 for higher damping force.

The damping band also engages a base inner arcuate surface. As the pivot arm 52 moves, the damping plate friction surface bears on the base inner arcuate surface creating a first and second damping force opposing a pivot arm 52 movement, thereby damping oscillatory movements of the pivot arm in each direction. The damping plate damping forces oppose movement of the pivot arm in either direction.

The analysis is;

$$T_{spr} = N*F \quad (1)$$

F is the distance between contact points 80, 82. The damping plate ramp surface 77 bears on the pivot arm at stop or contact point 79, which controls a rotation of the damping plate 76 about a protuberance or pivot point 79.

In particular, when the base 42 is stationary and the pivot arm 52 rotates clockwise with the damping mechanism, friction torque or damping force created on the surface of curvilinear friction surface 78 increases a reaction force P at point 79, where:

$$P = T_{spr}/A \quad (2)$$

A is the radial distance from the center of rotation O to P on the damping mechanism. O is the center of rotation of the pivot arm 52.

Figure 9:
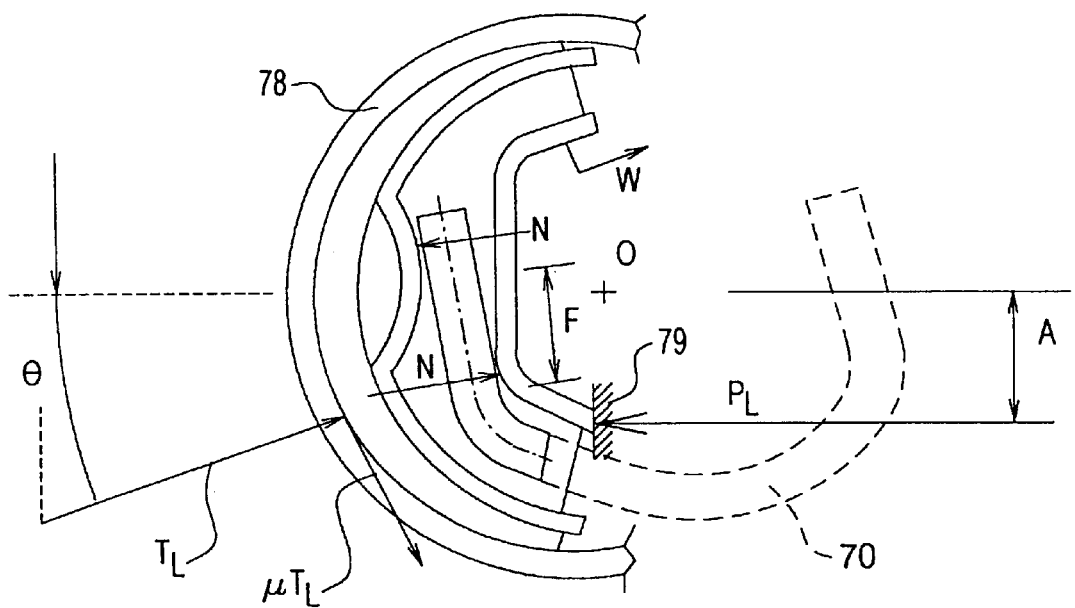
FIG. 9 is a top view of the damping plate.

Referring to FIG. 9, a top view of the damping plate., the torque equation for torque relative to point O is:

$$T_{spr} - P_L*A + \mu T_L*R = 0 \quad (3)$$

Where $T_L$ and $P_L$ are each a loading force created by a belt tension or force. $\mu$ is the coefficient of friction of the surface of friction surface 78. Each portion of friction surface 78 described herein may comprise any frictional material applicable to damping a relative movement of adjacent sliding surfaces known in the art, including but not limited to nylon 6, nylon 66 and Teflon®. R is a radius of friction surface 78.

Continuing, the forces in the x direction are:

$$T_L*\cos\theta + \mu T_L \sin\theta - P_L = 0 \quad (4)$$

Then:

$$T_L = P_L[1/(\cos\theta + \mu\sin\theta)] \quad (5)$$

Replacing $T_L$ and $P_L$ in the torque equation (3) results in:

$$T_{spr} - P_L*A + \mu*P_L[1/(\cos\theta + \mu\sin\theta)]*R = 0 \quad (6)$$

Factoring the equation gives:

$$P_L = T_{spr}/A*[(\cos\theta + \mu\sin\theta)/((\cos\theta + \mu\sin\theta) - *R/A)] \quad (7)$$

Equation (7) gives the value of the loading force $P_L$ exerted at contact point 79 on damping plate ramp surface 77 during a loading cycle, see FIG. 8.

Figure 10:
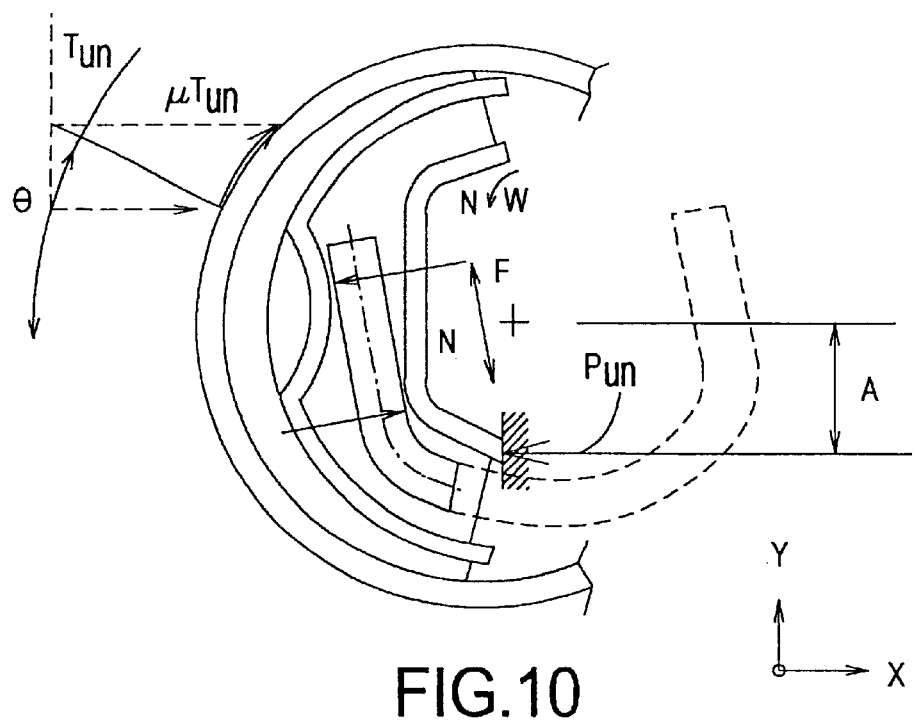
FIG. 10 is a free body diagram of the damping mechanism in a tensioner base.

Referring to FIG. 10, a free body diagram of the damping mechanism in an unloading direction, and following the same logic described in FIG. 9, when the tensioner arm moves counterclockwise or "unloads", friction torque reduces reaction $P_{un}$.

Reaction $P_L/P_{un}$ develops a damping force on friction surface $T_L/T_{un}$. A greater P creates a higher normal reaction T and correspondingly higher friction torque and vice versa.

$$P_{un} = T_{spr}/A*[(\cos\theta - \mu\sin\theta)/((\cos\theta - \mu\sin\theta) + *2*R/A)] \quad (8)$$

Equation (8) gives the value of the force $P_{un}$ exerted at point 79 on damping plate 76 during an unloading cycle, see FIG. 8.

Damping asymmetry, and related coefficient of asymmetry, is determined by the belt tension or P load difference between the loading and unloading condition which correspond to a first damping force and second damping force.

$$K_{AS} = \Delta T_{Belt\ Loading}/\Delta T_{Belt\ Unloading} \quad (9)$$

Where:

$K_{AS}$ is the coefficient of asymmetry.

$\Delta T_{Belt\ Loading}$ is the change in belt tension with corresponding first damping force when the pivot arm moves away from a belt or endless member.

$$\Delta T_{Belt\ Loading} = T_{max\ belt} - T_{belt\ nom} \quad (10)$$

$\Delta T_{Belt\ Unloading}$ is the change in belt tension with second damping force when the pivot arm moves toward a belt.

$$\Delta T_{Belt\ Unloading} = T_{belt\ nom} - T_{belt\ min} \quad (11)$$

In the tensioner design, reaction force P delivers the belt tension. Therefore, $$K_{AS} = (P_L - P)/(P - P_{un}) \quad (12)$$

Upon substituting, the equation for the coefficient of asymmetry is:

$$K_{AS} = [(\cos\theta - \mu\sin\theta + \mu*R/A)/(\cos\theta + \mu\sin\theta) - *R/A)] \quad (13)$$

Where $\theta = \arctan(\mu)$.

Example Case.

Assuming the following values for the noted variables:

$\mu = 0.2$, coefficient of friction

R=33 mm

A=16 mm $\theta = 11.3°$ and applying the foregoing equations gives:

$$K_{AS} = 1.35/0.61 = 2.2$$

The coefficient of asymmetry can be tuned by varying the coefficient of friction of the friction surface 78 as well as by varying the dimensional variables R and A.

In the case of a damping mechanism having a double damping band, the asymmetry will be 1.5 to 2 times greater than for a single damping band, based upon the logic described herein.

Diagram 1 and Diagram 2 depict tensioner load and damping measured statically and dynamically for a single damping mechanism.

Figure 15:
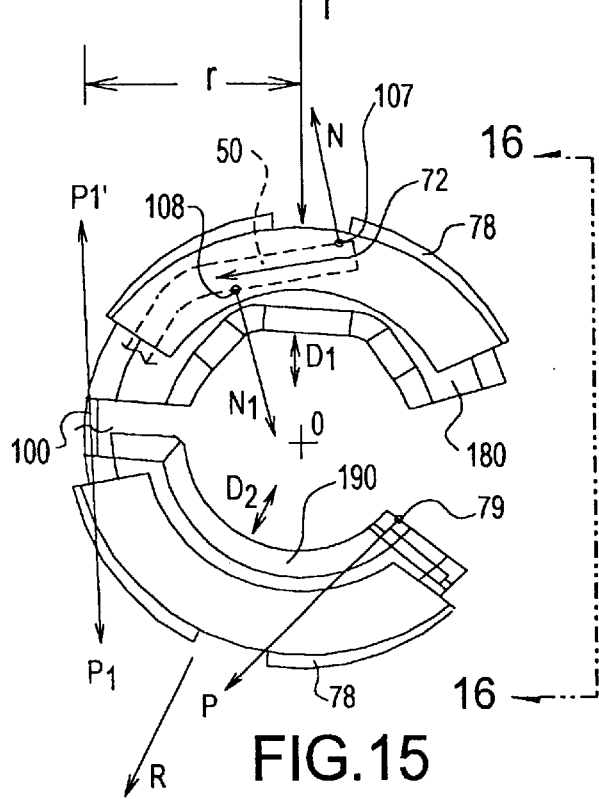
FIG. 15 is a bottom plan of a first alternate embodiment of the damping mechanism.

Diagram 1.
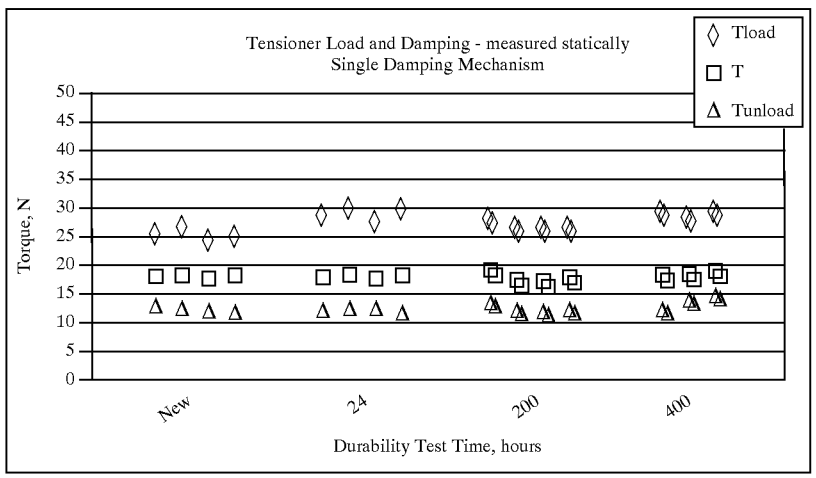
Diagram 2.
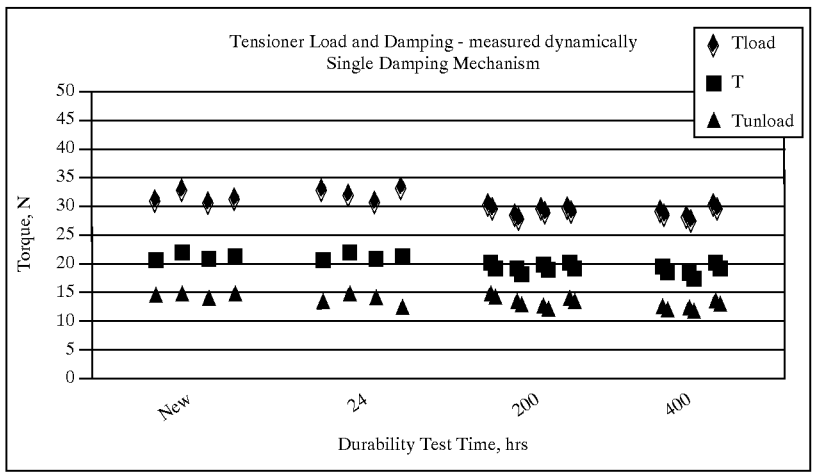
Diagram 3 and Diagram 4 depict tensioner load and damping measured statically and dynamically for a double damping mechanism, see FIG. 15.
Diagram 3.
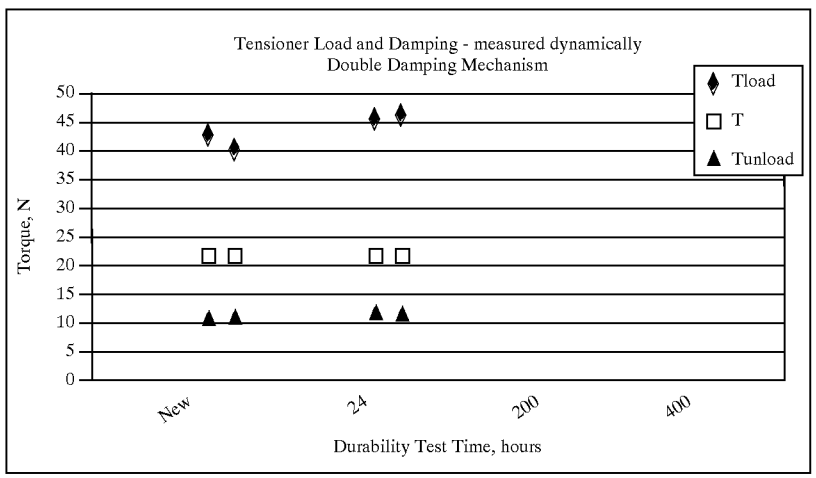

Diagram 4.

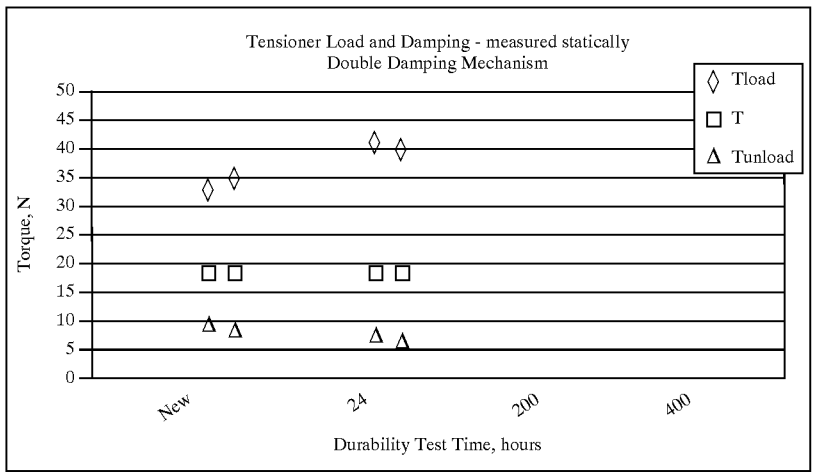

In each of the foregoing diagrams the asymmetric characteristic is depicted by the spread between the $T_{load}$ point and the T point versus the spread between the $T_{unload}$ point and the T point. Determination of the value of $K_{AS}$ is a simple matter of measuring the values on each graph. Each is as follows:

| For Diagram 1: | 24 | 200 | 400 |
|---|---|---|---|
| $T_{load}$ − T = 10 | | 8 | 10 |
| T − $T_{unload}$ = 6 | | 6 | 6 |
| $K_{AS}$ = 1.66 | | 1.33 | 1.66 |

| For Diagram 2: | | | |
|---|---|---|---|
| $T_{load}$ − T = 12 | | 9 | 10 |
| T − $T_{unload}$ = 7 | | 6 | 6 |
| $K_{AS}$ = 1.71 | | 1.5 | 1.66 |

For Diagram 3:

$T_{load}-T=22$ $T-T_{unload}=11$ $K_{AS}=2.00$

For Diagram 4:

$T_{load}-T=24$ $T-T_{unload}=11$ $K_{AS}=2.18$

Figures 11, 12:
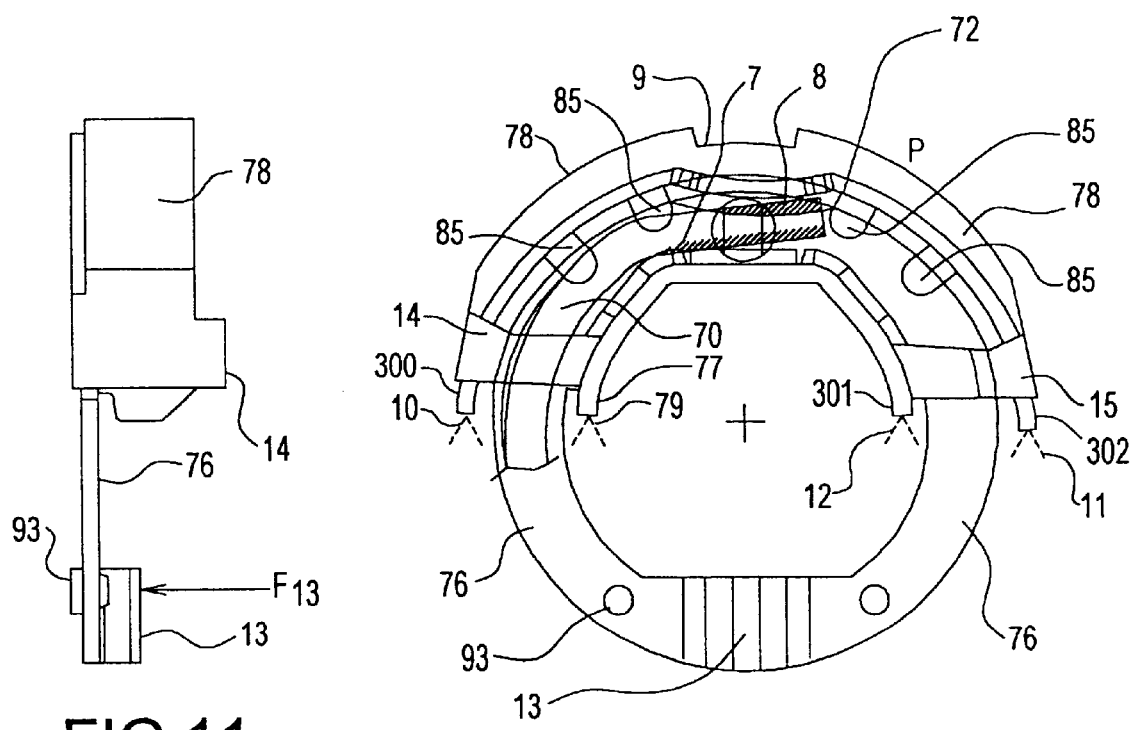
FIG. 11 is a side view of the damping mechanism along line 11—11 in FIG. 8.
FIG. 12 is a top plan view of the damping mechanism.

FIG. 11 is a side view of the damping mechanism along line 11—11 in FIG. 8. Guide 14 is provided for properly positioning the spring relative to damping plate 76. Spring support 13 protrudes above the damping plate 76. The spring is installed in compression with an axial load that operates parallel to an axis of rotation of the pivot arm, exerting force $F_{13}$ upon spring support 13, as well as guide 14 and 15. This presses the damping plate 76 against a pivot arm, not shown, see FIG. 2.

Friction surface 78 is affixed to damping plate 76 by tabs 85, see FIG. 12. Friction pads 93 provide a low friction surface by which damping plate 76 slidingly engages a pivot arm, not shown, see FIG. 2.

FIG. 12 is a top plan view of the damping mechanism. Tabs 85 interlock with damping plate 76 to affix friction surface 78 to damping plate 76. An end 72 of spring 70 contacts damping plate 76 at contact points 80, 82. Groove 9 bifurcates friction surface 78 into two symmetric halves, each half engaging a tensioner base inner arcuate surface (not shown). Groove 9 is substantially aligned with contact points 80, 82 for reasons described herein.

In operation with a movement in a clockwise direction, and in the case with a reduced belt or hubload, force P is relatively low. Hubload is the load exerted on the pulley pivot point 32 resulting from the force exerted on the pivot arm by a belt. Contact point 79 operates to constrain the travel of damping plate 76 in the relatively lightly loaded condition. In the case of increased hubloads, damping frame 76 bears on contact point 10 and contact point 79 in the more heavily loaded condition. This is the result of slight plastic deformation of the damping plate and friction surface under increased load.

In the case of a counterclockwise movement of a tensioner arm, contact point 12 operates to constrain travel of damping plate 76 in the relatively lightly loaded condition. In the case of greater hubloads, contact point 11 operates in conjunction with contact point 12 in the more heavily loaded condition. Again, this is the result of slight plastic deformation of the damping plate under load.

In either case, contact of the damping plate with contact point 79 or 10 causes the damping plate to rotate having a center of rotation at point 79 or 10 depending on the magnitude of the spring torque being applied. That is, referring to FIG. 8, operation of forces at 80, 82 will cause damping plate 76 to engage point 79 and perhaps 10, depending on the load. Once so engaged damping plate 76 will rotate slightly about point 79 or 10 thereby bringing friction surface 78 into substantial contact with an inner surface of the housing, thereby exerting a normal force on the frictional surface. This logic also applies to engagement of the damping plate with contact points 11, 12.

As one skilled in the art can appreciate, controlling the frame and travel and direction of rotation between pivot arm points 79, 10, 11, and 12 enhances the engagement between the friction surface 78 and the inner surface of the housing. The pivot arm may rotate through its entire operational angular range of motion with respect to the housing since the damping plate is captive to the arm between the contact points 79, 10, 11, 12.

Figure 13:
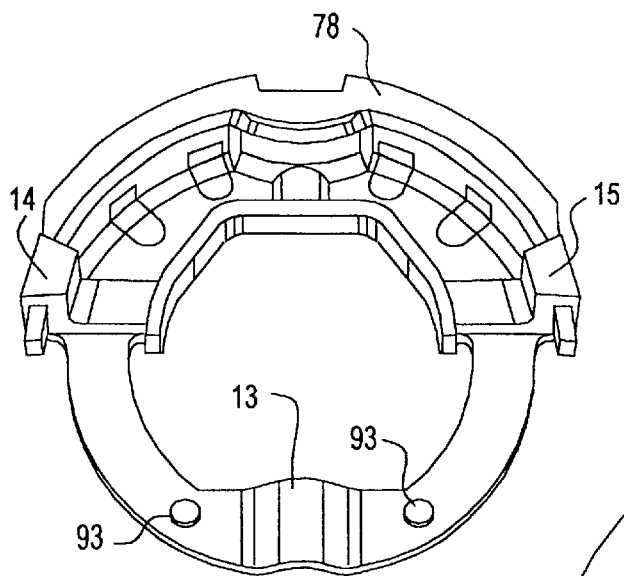
FIG. 13 is a top perspective view of the damping plate.

FIG. 13 is a top perspective view of the damping plate. Friction pads 93 are attached to damping plate 76 to reduce friction between damping plate 76 and a pivot arm (not shown). One will note that the damping plate is not axially affixed for substantially controlled rotation about point O. Damping plate 76 floats between points 79, 10, 11, and 12 under the spring during operation. This allows each friction surface to properly orient under load so as to fully engage the base inner arcuate surface during operation. This also allows the friction surface to accommodate wear by constantly reorienting during the life of the tensioner. Guides 14 and 15 properly position and support the spring end 72 within the damping plate 76. This relationship is necessary for proper placement of spring end 72 in contact with damping plate points 7, 8.

Figure 14:
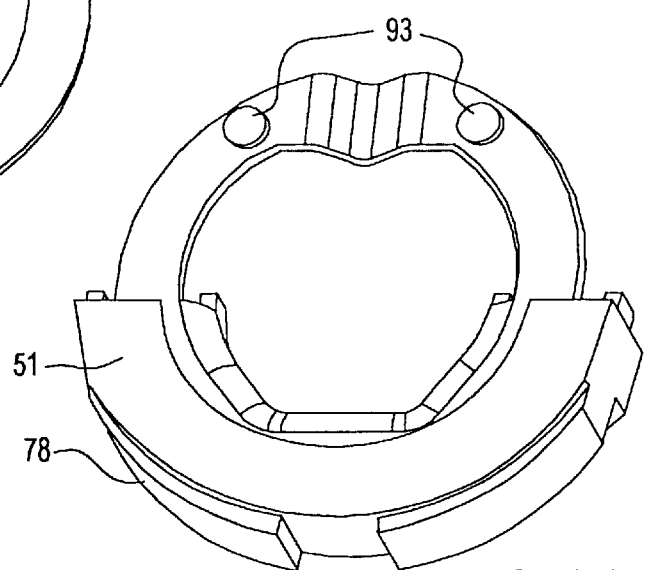
FIG. 14 is a bottom perspective view of the damping plate.

FIG. 14 is a bottom perspective view of the damping plate. The bearing surfaces of pads 93 are at substantially coplanar with lower surface 51 of friction surface 78, thereby maintaining the damping plate substantially flat upon the pivot arm. Surface 51 has the same coefficient of friction as friction surface 78.

FIG. 15 is a bottom plan of a first alternate embodiment of the damping mechanism. The first alternate embodiment comprises two friction surfaces 78 on damping plate 76. Opposing forces $P_1$ and $P_1'$ act on the damping plate at pivot joint 100. Spring end 72 contacts damping plate 76 at contact points 107 and 108. In operation, spring 50 generates force:

$$P_1 = T_{spr}/r$$

Figure 16:
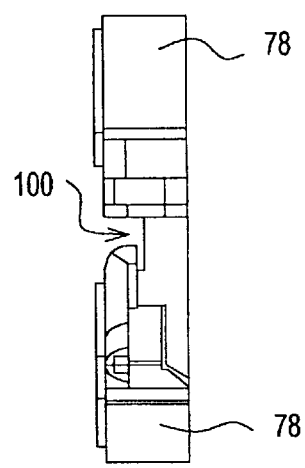
FIG. 16 is a side elevation view of the damping mechanism along line 16—16 in FIG. 15.

Pivot joint 100, see FIG. 16, allows the damping plate to flex slightly, thereby allowing both parts of the damping plate, 180 and 190, to move relative to each other. The relative movement of frame parts 180 and 190 due to the flexing of the damping plate at pivot joint 100 is radial in relation to a center of rotation O of damping plate 76. Therefore, each friction surface 78 is moveable in direction D1 and D2 respectively.

When the damping plate is in equilibrium, force $P_1'$ provides opposite and equal force $P_1$ to the other parts of damping plate 76, i.e., 180 and 190. Forces $P_1$ and P add creating resultant R:

$$R = P_1 + P \quad (14)$$

Resultant operates on the inner arcuate surface of tensioner base, not shown, see FIG. 2. Forces R and T operate at the interface between the tensioner base inner arcuate surface and the friction surface. These forces, in conjunction with the coefficient of friction, generate a frictional force at each of the friction surfaces.

In the equilibrium condition, force P is a balancing force acting to oppose, or balance, a belt load moment arm:

$$B_L * M = P * A \quad (15)$$

Or;

$$P = (B_L * M)/A \quad (16)$$

Where $B_L$ is a belt or hubload, M is the moment arm measured from the center of rotation O to the hubload on the arm, and P and A are as described herein.

The friction force, $(R+T)\mu$, is approximately 3 times larger than the friction force on a single damping mechanism due to additional force; $R = P + P_1$. P is the only force balancing the arm against a hubload.

FIG. 16 is a side elevation view of the damping mechanism along line 16—16 in FIG. 15. It shows the relative positions of friction surfaces 78. Pivot joint 100 is depicted between the friction surfaces. Friction surfaces 78 each have equal arcuate engaging lengths $A_L$, see FIG. 17, and have the same coefficient of friction, $\mu$. Of course, the damping characteristic of the damping mechanism may be changed in part by varying the length $A_L$ of each of the friction surfaces.

Figure 17:
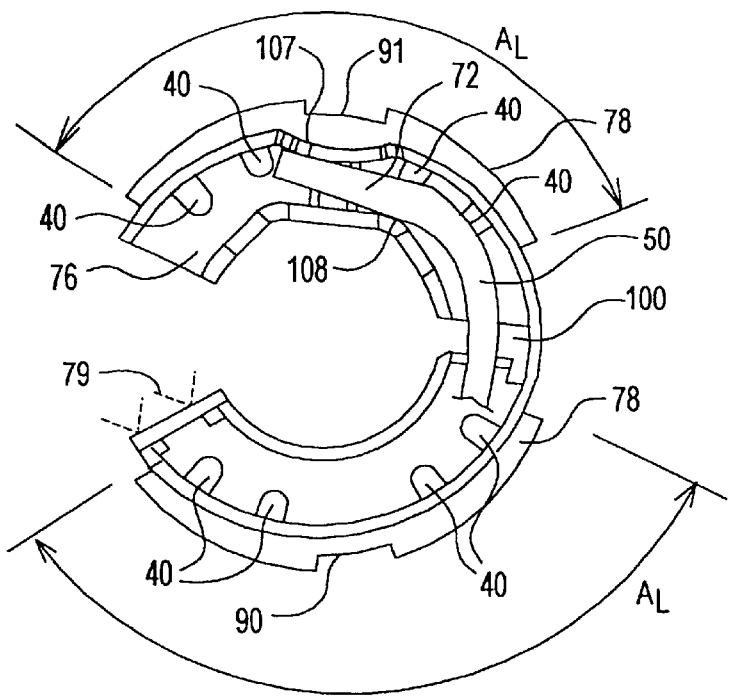
FIG. 17 is a top plan view of the first alternate damping mechanism.

FIG. 17 is a top plan view of the first alternate damping mechanism. Tabs 40 connect friction surfaces 78 to the damping plate 76. Spring end 72 contacts damping plate 76 at contact points 107 and 108. Pivot joint 100 allows damping plate 76 to flex, thereby allowing relative movement of friction surfaces 78 as described elsewhere is this specification.

Figure 18:
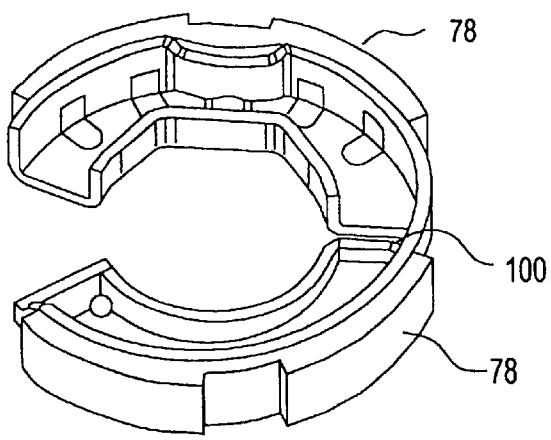
FIG. 18 is a top perspective view of the first alternate damping mechanism.

FIG. 18 is a top perspective view of the first alternate damping mechanism. Pivot joint 100 is shown between friction surfaces 78.

Figure 19:
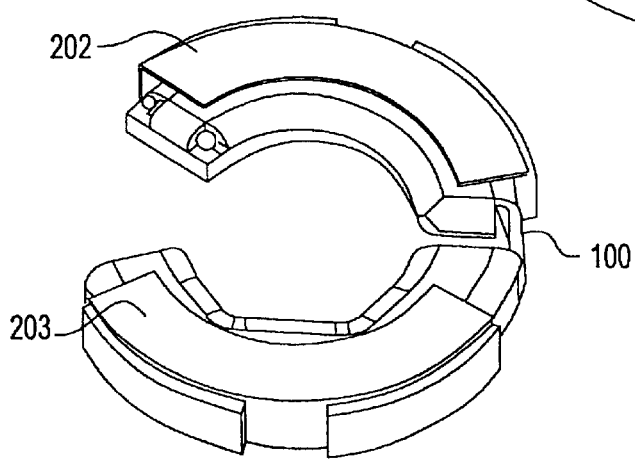
FIG. 19 is a bottom perspective view of the first alternate damping mechanism.

FIG. 19 is a bottom perspective view of the first alternate damping mechanism. Surfaces 202 and 203 engage a pivot arm (not shown). Surfaces 202 and 203 may have the same coefficient of friction as the friction surfaces if required by a user. In this embodiment, pads 93 used in the single friction surface embodiment, see FIG. 13, are not needed.

FIG. 20 is a top perspective view of an alternate damping mechanism. Spring supports 20, 21 are of unequal height to properly support a helical coil of a torsional spring (not shown). In operation, the spring is slightly axially compressed; thereby causing a force to be exerted upon damping surfaces 202 and 203 through spring supports 20 and 21. Supports 20, 21 serve to distribute an axial spring force evenly about the damping plate.

Figure 23:
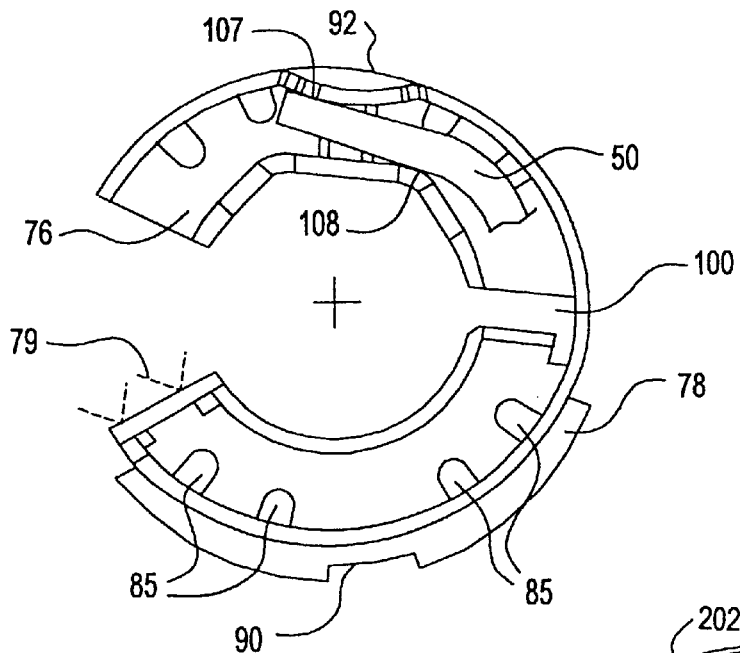
FIG. 23 is a top plan view of the second alternate embodiment.

FIG. 21 is a bottom plan view of a second alternate embodiment. The damping mechanism is substantially the same as the embodiment described in FIG. 15, with the exception that only a single friction surface 78 is used. Further, groove 91 is not present in friction surface 78. Instead, arcuate surface 92, see FIG. 23, provides a continuous contact surface for damping plate 76. Since it has a relatively low coefficient of friction, normal force T generates a negligible frictional force on the damping plate. For balancing, two forces (T+P) are present. For friction, two forces $R = P_1 + P$ are also present. Since the damping plate is in static equilibrium $P_1 = -P_1$.

FIG. 22 is a side elevation view of the damping mechanism along line 22—22 in FIG. 21.

FIG. 23 is a top plan view of the second alternate embodiment. Friction surface 78 is connected to damping plate 76 by tabs 85. The portion of the damping plate shown in the other embodiments as comprising a groove adjacent contact point 107, is in this embodiment a continuous arcuate surface 92 for engaging a pivot arm.

Figure 24:
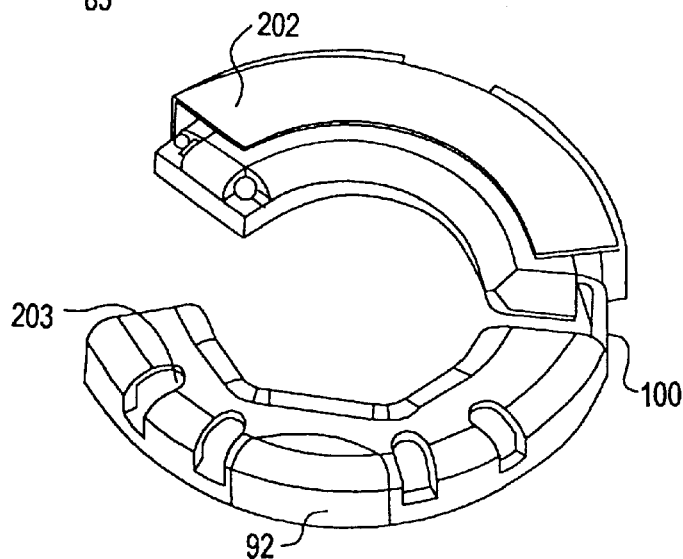
FIG. 24 is a bottom perspective view of the second alternate embodiment.

FIG. 24 is a bottom perspective view of the second alternate embodiment. Continuous arcuate surface 92 provides a bearing surface for receiving a force T as described herein.

Figure 25:
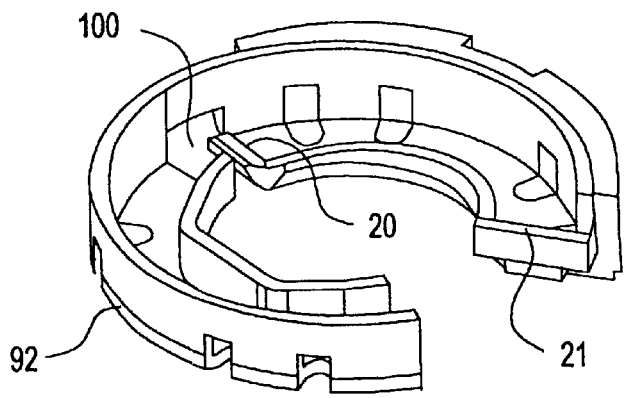
FIG. 25 is a top perspective view of the second alternate embodiment.

FIG. 25 is a top perspective view of the second alternate embodiment. Spring supports 20, 21 receive the torsional spring 50 (not shown) as well as an axial spring force described herein.

Operation of the System:

Tensioner damping is an important property for a tensioner used on a belt drive on an internal combustion (IC)

engine, such as that on an automobile. The belt drive generally comprises a multi-ribbed belt drive for driving accessory components such as an air-conditioner compressor, alternator, water pump, power steering pump, or it may comprise a timing belt drive to drive cam-valve-trains.

The majority of automotive belt drives use automatic tensioners having friction damping. The mean tension of each belt span adjacent to the tensioner is controlled by the tensioner spring. The dynamic portion, or tension fluctuation, is primarily controlled by tensioner damping. Tensioner damping is the primary element used to control tensioner arm vibration and to dampen system vibration.

Generally, the belt drives which use tensioners comprise two types, accessory belt drives and timing belt drives. For an accessory belt drive, the belt drives at least one component of significant effective inertia (0.004 kg–m$^2$ or more) which is an alternator in most cases. Effective inertia is the inertia of the rotating part of the component multiplied by the speed ratio to crankshaft:

$$I\_effect = I * (D\_crk/D)$$

The tensioner is placed anywhere before the first component of significant effective inertia in the belt movement direction. For a timing belt drive the tensioner is located before the first camshaft, also in the belt movement direction.

For an accessory belt drive of an IC engine, the dominant source of rotational vibration excitation is the crankshaft. For a timing belt drive, cam torque and crankshaft rotational vibration are major excitations. In certain cases, high torque pulses caused by a compressor or pump driven by the belt can also be major vibration sources.

Typical system vibration phenomena are excessive tensioner arm vibration, span vibration (flutter), dynamic belt slip and slip noise. All tend to decrease belt life and system reliability.

Figure 27:
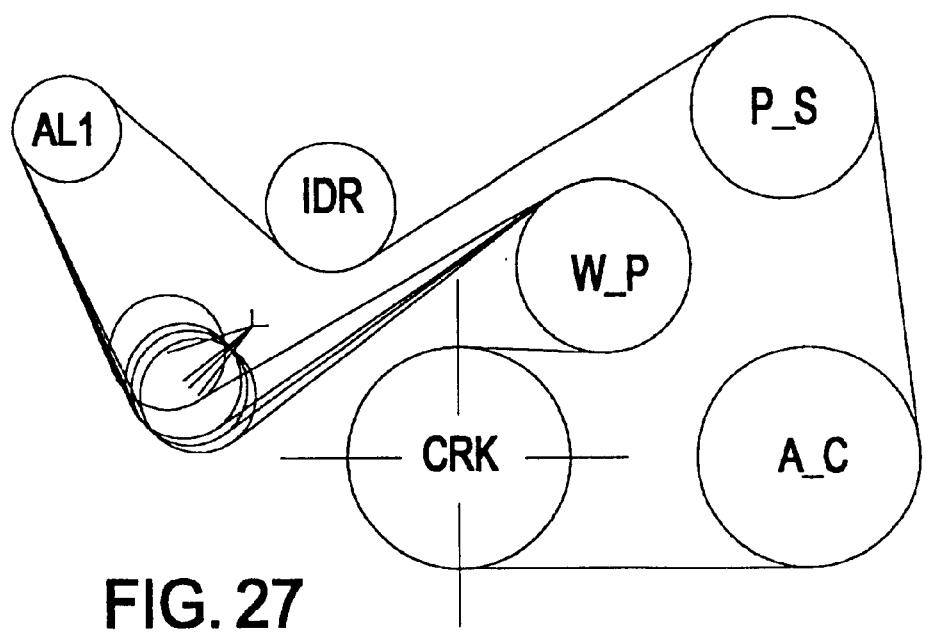
FIG. 27 is a schematic view of a typical belt drive for an engine.

FIG. 27 depicts a typical 4-cylinder IC engine layout. When the accessories and transmission are all loaded and the belt tension is less than 300 N and damping less than 30%, there will be span flutter between power steering (P_S) and the idler (IDR), dynamic slip and chirp noise at P_S and arm vibration of 6 mm (peak-peak) or more at its resonance rpm. Other parts of the engine layout are the water pump is W_P, the air conditioner is A_C, the crankshaft is CRK, the alternator is ALT.

Figure 28:
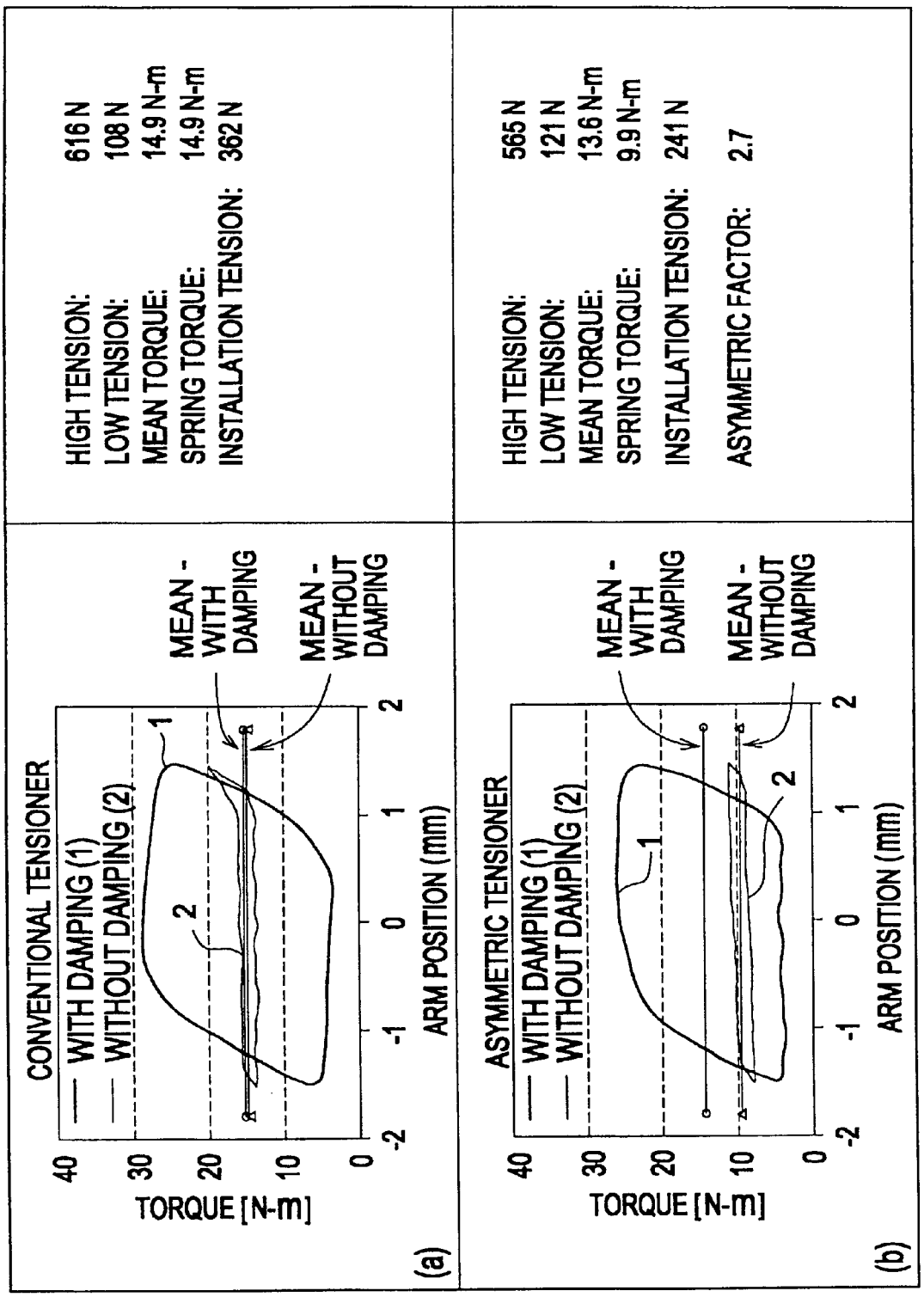
FIG. 28A is a comparison of tensioner parameters between a conventional tensioner and an asymmetric tensioner.
FIG. 28B is a comparison of tensioner parameters between a conventional tensioner and an asymmetric tensioner.
Figure 30A:
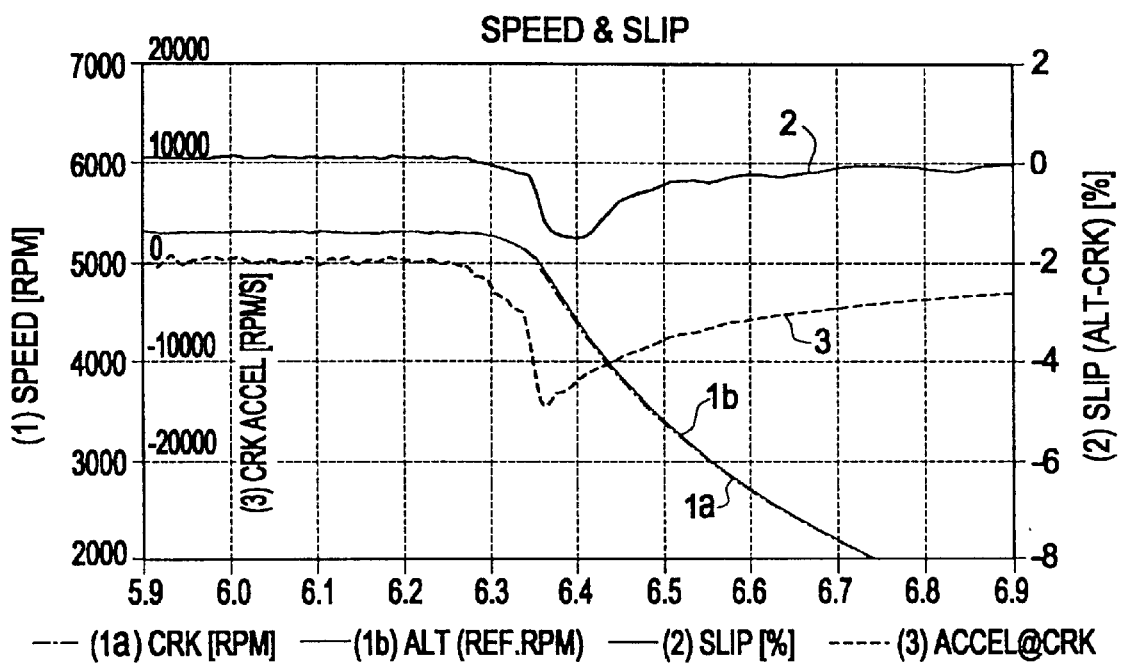
FIG. 30A is a comparison of tensioner parameters for an asymmetric tensioner.
Figure 30B:
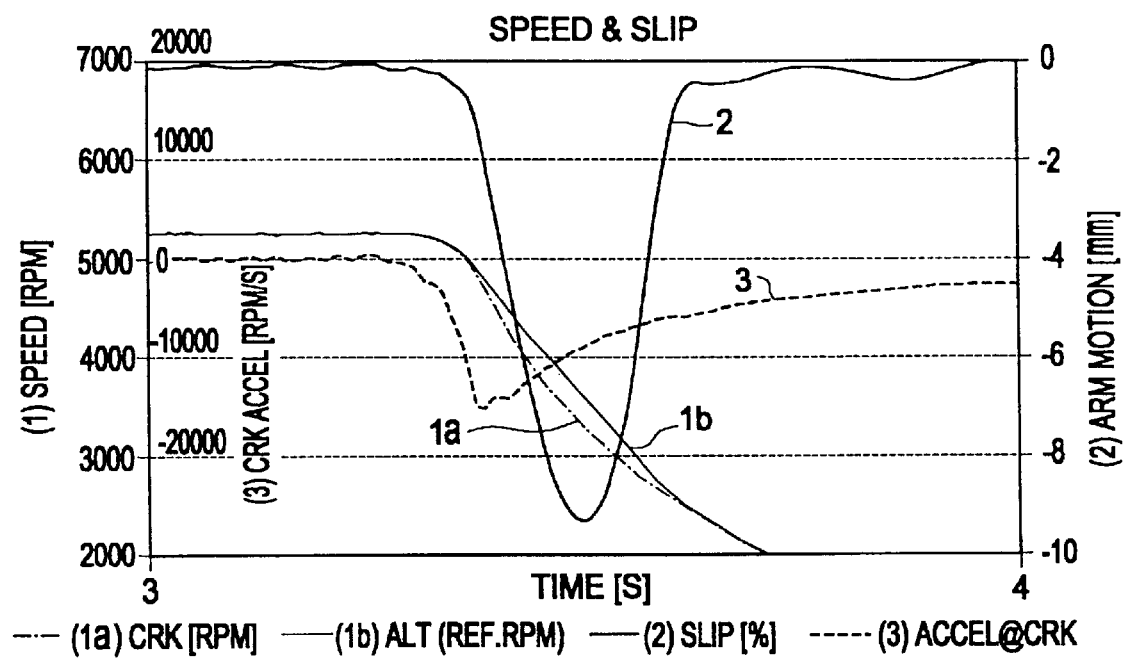
FIG. 30B is a comparison of tensioner parameters for a conventional tensioner.
Figure 30C:
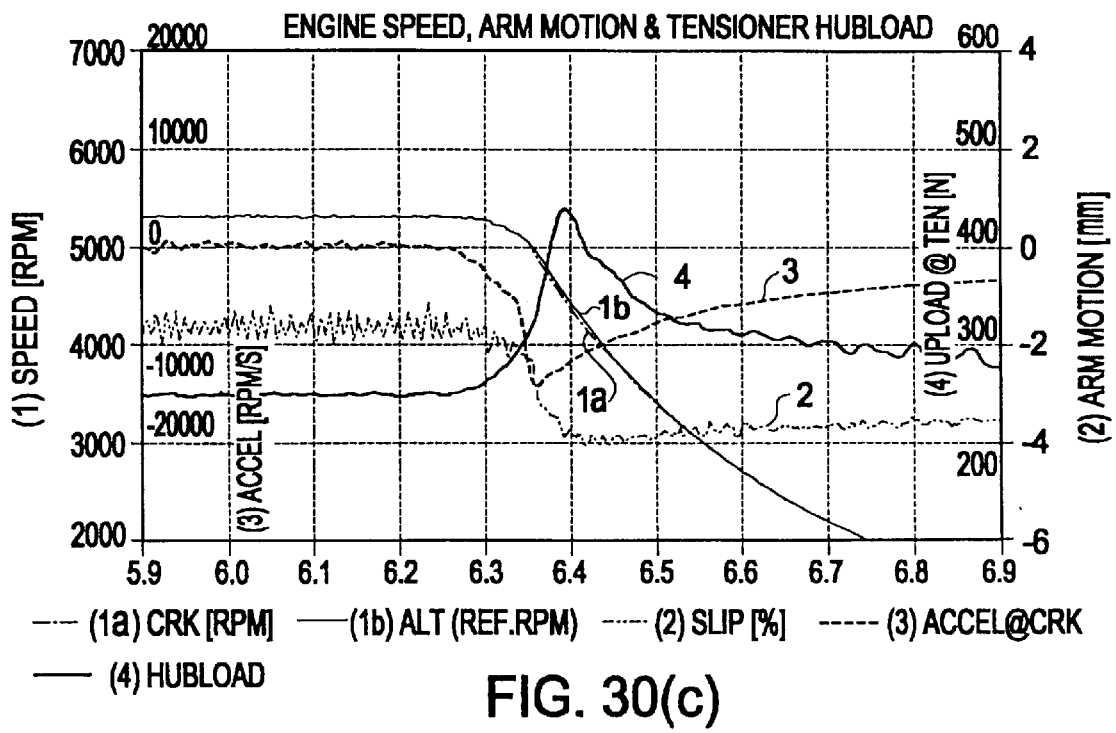
FIG. 30C is a comparison of tensioner parameters for an asymmetric tensioner.
Figure 30D:
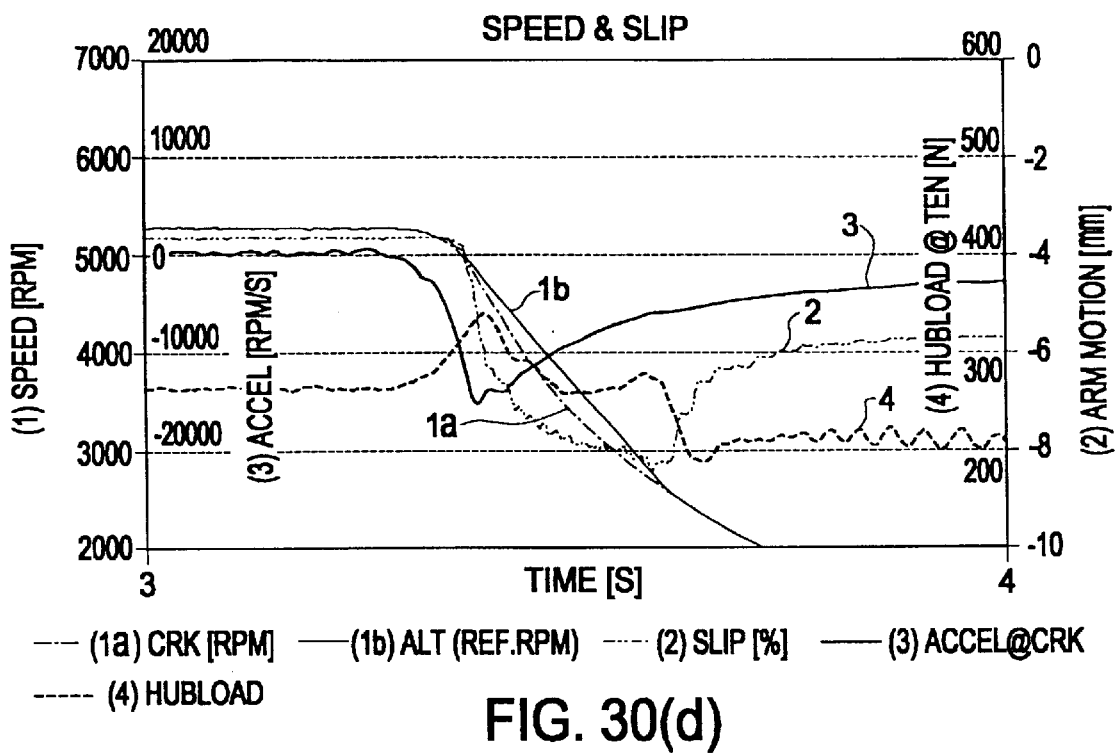
FIG. 30D is a comparison of tensioner parameters for a conventional tensioner.

FIG. 28 depicts dynamic hysteresis curves and tension/damping parameters for the engine in FIG. 27, with comparison between an asymmetric tensioner (FIG. 28b) and a conventional tensioner (FIG. 28a). The asymmetric factor $K_{AS}$, or coefficient of asymmetry, of the asymmetric tensioner in this case is 2.7. The tension generated by the spring is 362 N for the conventional tensioner and 241 N for the asymmetric tensioner. The tension in the asymmetric tensioner is 33% less than that of the conventional tensioner. The tension is also called installation tension, which is equivalent to mean tension during the majority of engine operation time.

Shown in FIG. 29 is a comparison of vibration and dynamic forces over the low rpm range where the accessory belt drive has its 1$^{st}$ resonant vibration. As one can see from the diagrams, excitation to the belt drive system, i.e., the crankshaft (CRK) rotational vibration, is the same with either tensioner, FIG. 29A. FIG. 29A indicates less vibration of the alternator (ALT) span with the asymmetric tensioner. FIG. 29B indicates that tensioner arm vibration is reduced 40% or more with the asymmetric tensioner as compared to the conventional tensioner. FIG. 29C indicates dynamic tension at the idler (IDR). The high belt tension fluctuation is reduced about 20% with the asymmetric tensioner. In this case, high tension fluctuation at the power steering (P_S) to idler (IDR) span is the reason for span vibration and dynamic slip and slip noise at the P_S. FIG. 29D illustrates a definition of dynamic tension at the idler.

Since the asymmetric tensioner dissipates more energy from the belt drive than a conventional tensioner, it improves the vibration of a belt drive, its dynamics and noise. Further, with the asymmetric tensioner, if the asymmetric factor is higher or the installation tension is raised to the same level as for the conventional tensioner, the asymmetric tensioner's effective damping can be further increased to improve the system vibration, reducing it to a lower level.

Although applicable to any front end accessory drive, since small displacement engines such as the 4-cylinder and 3-cylinder, 2.5 L or less, gasoline fueled and especially diesel fueled, have typically large CRK rotational vibrations, asymmetric tensioners significantly improve or eliminate vibration and noise problems.

Another benefit of the asymmetric damping tensioner is that under transient operation of the engine, acceleration or deceleration, an asymmetric tensioner also provides better tension control than a conventional tensioner. In the case where at least one component in the drive has an effective inertia of 0.004 kg-m$^2$ or more, an acceleration or deceleration rate in excess of 6000 rpm/sec can be considered as the level beyond which an asymmetric tensioner will show significantly improved performance over a conventional tensioner.

During engine acceleration, the inertial torque of components in the accessory drive will tighten the belt spans and elongate the belt. Inertial torque generated by any accessory component can be approximately expressed as its effective inertia multiplied by the maximum rate of engine acceleration. For example, an alternator having 0.01 kg-m$^2$ of effective inertia will generate 6.3 N-m of inertia torque under an engine deceleration rate of 6000 rpm/sec. Assuming the alternator is subject to 1.3 N-m of load from generating electricity, the difference of 5.0 N-m torque will continue to "drive" the belt in the direction of rotation. If the engine is under an acceleration of 6000 rpm/sec, the inertial torque will be added to the load torque giving a result of 7.6 N-m of inertia torque.

In most cases, problems occur when the engine is accelerated in the RPM range where the engine firing frequency covers the 1$^{st}$ natural frequency of the belt drive. The elongated portion of the belt is taken-up by tensioner arm travel, that is, the tensioner arm will move towards the belt in the tensioner 'unloading' direction. If damping in the unloading direction is too high, tension of the belt spans adjacent to the tensioner will decrease and hence all the other span tensions will also decrease, resulting in slipping and noise. For a given tensioner force, because the damping friction of an asymmetric tensioner in the unloading direction is significantly lower than that of a conventional tensioner, higher span tension is maintained by the tensioner during the engine acceleration, thereby preventing slip and slip noise.

During engine deceleration, the inertial torque of some component, e.g. the alternator or fan can be so high that it will continue to "drive" the belt in the direction of rotation. Since a tensioner is usually located at a slack-side span with respect to the crankshaft, when inertial torque is driving the belt in the forward direction, tensions in some spans will reduce and belt length be shorter. The tensioner spans can then become the tight-side and the tensioner arm is pushed by the belt in the tensioner loading direction, i.e., away from the belt. If tensioner damping in the loading direction is not high enough, tension of the tensioner spans may not be high enough, which may lead to belt slip and slip noise.

Figure 26:
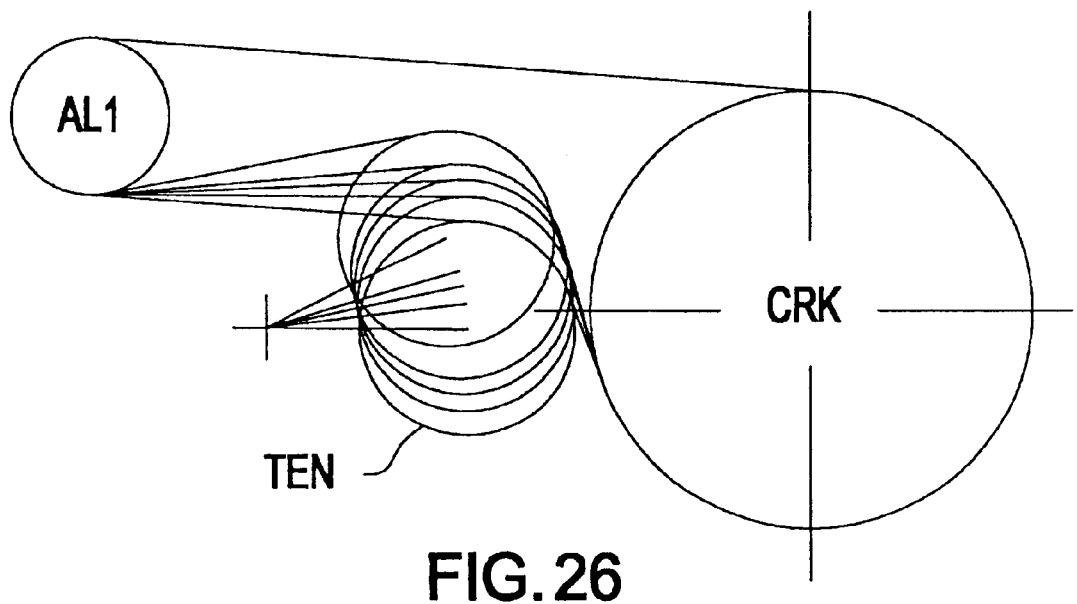
FIG. 26 shows a simple two-point drive with only one accessory component.

Shown in FIG. 30 is the example of tensioner performance during engine deceleration. FIG. 26 shows a simple two-point drive with only one accessory component, an alternator, ALT driven by a crankshaft CRK. The tensioner is marked TEN and its relative movement is shown. During high engine deceleration, slipping at the ALT and associated slip noise will occur if the tensioner cannot provide enough tension when the tensioner spans become the tight side and the tensioner is loaded. Shown in FIG. 30C for the asymmetric tensioner and FIG. 30D for a conventional tensioner, the conventional tensioner has slightly higher installation tension (264 N) than the asymmetric tensioner (248 N). Since the asymmetric tensioner can provide higher damping when it is loaded by the belt during the high deceleration, the mean tension reached is 440 N; while with the conventional tensioner the mean tension is only 340 N. At the same time, the conventional tensioner arm moved twice the distance as that of the asymmetric tensioner arm. As shown in FIG. 30A for an asymmetric tensioner and FIG. 30B for a conventional tensioner, belt slip on the alternator was 9.3% with the conventional tensioner but only 1.4% with the asymmetric tensioner, a significant improvement.

Figure 31:
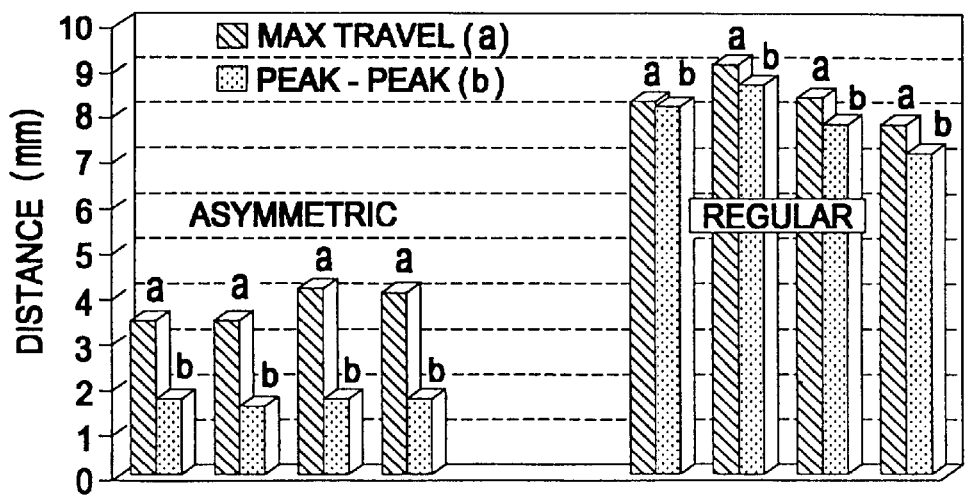
FIG. 31 is a comparison of tensioner arm motion during a cold start for a conventional tensioner and an asymmetric tensioner.

Shown in FIG. 31 is the comparison of tensioner arm motion during engine start-up. Engine start up usually occurs with the resonant vibration of belt drive having a natural frequency lower than the firing frequency at idle speed. It is one case of engine acceleration where system resonance RPM is within its RPM range. The belt drive is the same as in FIG. 27 and tensioners are the same as in FIG. 28. With the asymmetric tensioner, arm motion is reduced to about half of the magnitude of the conventional tensioner arm motion. Lower arm motion means better control of system dynamics as well as significantly improved tensioner life.

Figure 32:
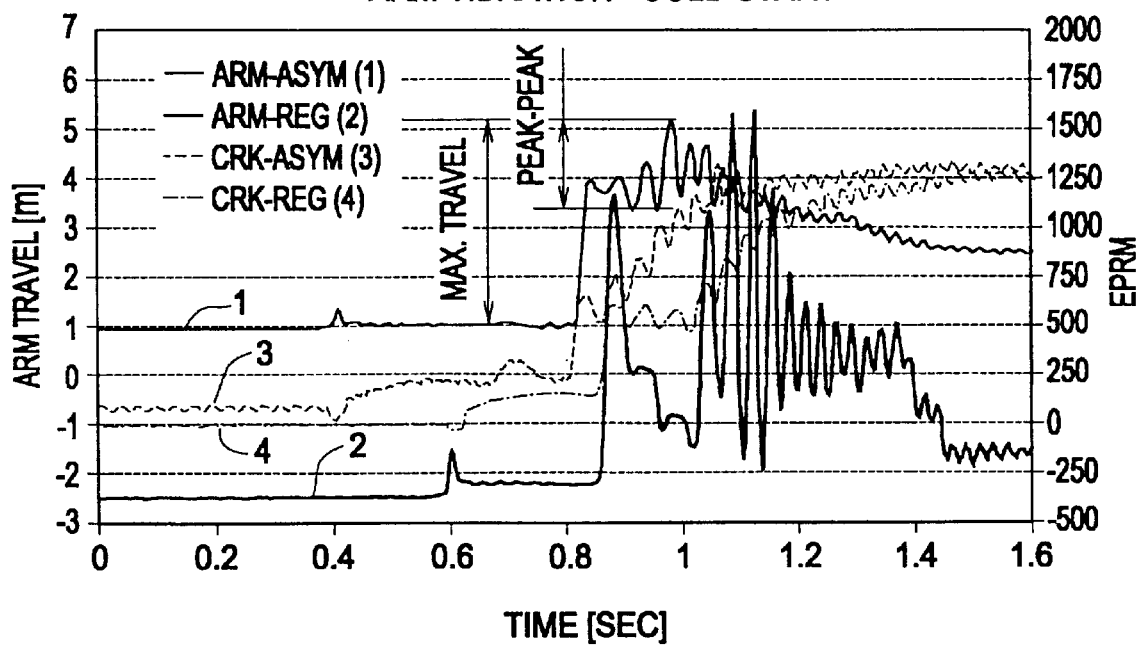
FIG. 32 is a comparison of arm travel for a conventional tensioner and an asymmetric tensioner.

FIG. 32 is a comparison of arm travel for a conventional tensioner and an asymmetric tensioner. The asymmetric tensioner arm travel is line 1. The conventional tensioner arm travel is line 2. CRK denotes the crankshaft speed in each case for the asymmetric (Asym) and conventional (Reg) tensioner. As shown, the arm travel for the asymmetric tensioner during a cold start is significantly less than that of the arm travel for the conventional tensioner.

Although a single form of the invention has been described herein, it will be obvious to those skilled in the art that variations may be made in the construction and relation of parts without departing from the spirit and scope of the invention described herein.

We claim:

1. An accessory drive system comprising:
   a drive pulley;
   at least one driven pulley;
   a belt connecting the drive pulley to the driven pulley;
   a tensioner for maintaining a tension in the belt, the tensioner comprising an arm for receiving a belt load and pivotably mounted to a base, a pulley journaled to the arm engaging the drive belt, a biasing member engaging the base and a damping member having a friction surface engaging the base;
   the damping member engaging the arm at a pivot point;
   the biasing member engaging the damping member at a first contact point and at a second contact point such that a normal force is impressed upon the friction surface by the belt load; and
   the damping member damping a movement of the arm by having an asymmetric damping force wherein a damping force in a loading direction is greater than a damping force in an unloading direction; and
   wherein the ratio of the damping force in the loading direction to the damping force in the unloading direction is in the range of 1.5 to 5.

2. The accessory drive system as in claim 1, wherein the biasing member comprises a torsion spring.

3. The accessory drive system as in claim 1, wherein the tensioner is located in the system in a location before a rotating element having the greatest effective rotational inertia in a belt direction of movement.

4. An accessory drive system comprising:
   a driver pulley;
   at least one driven pulley;
   a belt connecting the driver pulley to the driven pulley;
   a tensioner having a hubload and a tensioner arm engaged with the belt for maintaining a tension in the belt and having an asymmetric damping ratio whereby a damping force in a loading direction is greater than a damping force in an unloading direction; and
   a driven pulley slip is less than 2% of a driver pulley rotation.

5. The drive system as in claim 4, wherein:
   the driven pulley having an effective rotational inertia greater than 0.004 kg–m$^2$;
   the driver pulley having a rotational speed; and
   whereby a tensioner arm oscillation is minimized for a driver pulley deceleration rate greater than 6000 RPM/sec.

6. The drive system as in claim 4, wherein:
   the tensioner is located in the system in a location immediately before a pulley having the greatest rotational inertia in a belt direction of movement.

7. The drive system as in claim 6, wherein the hubload increases during a driver pulley deceleration from a steady state value to a maximum value in less than 0.15 second.

8. The drive system as in claim 7, wherein the driver pulley deceleration imparts a force on the tensioner in a loading direction.

9. A tensioner comprising:
   an arm for receiving a belt load and pivotably mounted to a base, a pulley journaled to the arm engaging a drive belt, a biasing member engaging the base and a damping member having a friction surface engaging the base;
   the damping member engaging the arm at a pivot point, the pivot point radially disposed a distance (A) from an arm center of rotation (O);
   the biasing member engaging the damping member at a first contact point and at a second contact point such that a normal force is impressed upon the friction surface by the belt load;
   the damping member damping a movement of the arm by having an asymmetric damping force wherein a damping force in a loading direction is greater than a damping force in an unloading direction; and
   wherein the ratio of the damping force in the loading direction to the damping force in the unloading direction is in the range of approximately 1.5 to 5.

10. The tensioner as in claim 9, wherein the biasing member comprises a torsion spring.

11. A damping mechanism for a tensioner comprising:

a channel for receiving an end of a torsion spring;

the channel having an arcuate frictional surface, the arcuate frictional surface cooperatively engageable with a tensioner base;

the channel having a first torsion spring contact point and a second torsion spring contact point;

the first torsion spring contact point and the second torsion spring contact point cooperatively disposed whereby upon application of a spring torque to the channel a normal force is applied to the arcuate frictional surface; and a second arcuate frictional surface engageable with the tensioner base, the second arcuate frictional surface pivotally engaged with the channel, whereby the second arcuate frictional surface is radially pivotable with respect to the channel upon application of the spring torque to the channel.

12. The damping mechanism as in claim 11 wherein the arcuate frictional surface is disposed radially outwardly from the channel with respect to a center of rotation (O).

13. The damping mechanism as in claim 11 further comprising:

a ramp surface for engaging a tensioner pivot arm, the ramp surface disposed radially outwardly from a center of rotation (O).

14. A belt drive system comprising:

a belt;

at least two pulleys engaged with the belt, each pulley connected to a system component;

a tensioner having a tensioner pulley, the tensioner pulley engaged with the belt;

the tensioner having an arm for receiving a belt load and pivotably mounted to a base, a biasing member engaging the base and a damping member having a friction surface engaging the base;

the damping member engaging the arm at a pivot point, the pivot point radially disposed a distance (A) from an arm center of rotation (O);

the biasing member engaging the damping member at a first contact point and at a second contact point such that a normal force is impressed upon the friction surface by the belt load;

the damping member damping a movement of the arm by having an asymmetric damping force wherein a damping force in a loading direction is greater than a damping force in an unloading direction; and wherein the ratio of the damping force in the loading direction to the damping force in the unloading direction is in the range of approximately 1.5 to 5.

15. The belt drive system as in claim 14 further comprising:

a second damping member pivotally engaged with the damping member; and the second damping member having a friction surface engaging the base.

16. The belt drive system as in claim 14, wherein the belt drive system has a deceleration rate in excess of 6000 rpm/second.

17. The belt drive system as in claim 14 further comprising:

one of the components has an effective inertia equal to or greater than approximately 0.004 kg–m$^2$; and the tensioner is disposed before the component in a belt drive direction.

18. The belt drive system in claim 17, wherein the component is a camshaft.

19. The belt drive system as in claim 17, wherein the component is an alternator.

20. The belt drive system as in claim 19, wherein a belt slip on the pulley is approximately 1.4%.

* * * * *